United States Patent
Yoon

(10) Patent No.: US 9,833,911 B2
(45) Date of Patent: Dec. 5, 2017

(54) DIRECT ACTING EXTENSIBLE AND RETRACTABLE ARM MECHANISM, AND ROBOT ARM PROVIDED WITH DIRECT ACTING EXTENSIBLE AND RETRACTABLE ARM MECHANISM

(71) Applicants: National Institute of Advanced Industrial Science and Technology, Tokyo (JP); Life Robotics Inc., Tokyo (JP)

(72) Inventor: Woo-Keun Yoon, Tokyo (JP)

(73) Assignees: National Institute of Advanced Industrial Science and Technology, Tokyo (JP); Life Robotics Inc., Tokyo (JP)

( * ) Notice: Subject to any disclaimer, the term of this patent is extended or adjusted under 35 U.S.C. 154(b) by 87 days.

(21) Appl. No.: 14/823,971

(22) Filed: Aug. 11, 2015

(65) Prior Publication Data
US 2015/0343648 A1 Dec. 3, 2015

Related U.S. Application Data

(63) Continuation of application No. 13/699,800, filed as application No. PCT/JP2011/062005 on May 25, 2011, now Pat. No. 9,248,576.

(30) Foreign Application Priority Data

May 31, 2010 (JP) ................................. 2010-124598

(51) Int. Cl.
B25J 17/02 (2006.01)
B25J 18/06 (2006.01)
(Continued)

(52) U.S. Cl.
CPC ................. *B25J 18/06* (2013.01); *B25J 9/06* (2013.01); *B25J 17/00* (2013.01); *B25J 18/02* (2013.01);
(Continued)

(58) Field of Classification Search
CPC . B25J 18/025; B25J 18/06; B25J 18/02; B25J 17/00; B25J 9/06; F16G 13/20; F16H 19/0636
See application file for complete search history.

(56) References Cited

U.S. PATENT DOCUMENTS 2,131,261 A * 9/1938 Aldeen .................... F16G 13/02
254/95
2,574,657 A * 11/1951 Pierce ....................... B66F 3/06
254/1

(Continued)

*Primary Examiner* — Zakaria Elahmadi
(74) *Attorney, Agent, or Firm* — Nakanishi IP Associates, LLC

(57) ABSTRACT

A multi-joint arm mechanism includes an arm supporting member a first, second and third joints. The third joint has a linear extension and retraction axis. The third joint includes flat-shaped first structures bendably coupled to one another, second structures having a C-shaped section and bendably coupled to one another, a supporting member supporting the stiffened first and second structures, and a drive member sending and drawing the stiffened first and second structures. The first and the second structures are linearly stiffened by being in contact with each other and return to a bent state by being separated from each other. The second structures are bent toward the bottom parts and conveyed into the arm supporting member. The first structures are bent in a same direction as the second structures and conveyed into the arm supporting member. The first structures are stored in the arm supporting member along the second structures.

11 Claims, 11 Drawing Sheets

(51) Int. Cl.
  *B25J 18/02* (2006.01)
  *B25J 17/00* (2006.01)
  *F16G 13/20* (2006.01)
  *F16H 19/06* (2006.01)
  *B25J 9/06* (2006.01)

(52) U.S. Cl.
  CPC ............ *B25J 18/025* (2013.01); *F16G 13/20* (2013.01); *F16H 19/0636* (2013.01); *Y10S 901/25* (2013.01); *Y10S 901/28* (2013.01); *Y10T 74/20329* (2015.01)

(56) References Cited

U.S. PATENT DOCUMENTS

| | | | | |
|---|---|---|---|---|
| 4,473,365 A * | 9/1984 | Lapeyre | ................ | B65G 17/08 198/850 |
| 4,726,247 A * | 2/1988 | Hormann | ................ | F16H 19/04 49/325 |
| 4,819,495 A * | 4/1989 | Hormann | ................ | B66F 3/06 49/325 |
| 5,139,464 A * | 8/1992 | Lehnert | ................ | E04H 12/185 474/155 |
| 5,271,182 A * | 12/1993 | Greisner | ................ | B66F 3/06 49/325 |
| 5,303,817 A * | 4/1994 | Kissee | ................ | B65G 23/16 198/833 |
| 5,355,643 A * | 10/1994 | Bringolf | ................ | B66F 3/06 24/418 |
| 5,896,702 A * | 4/1999 | Wæhrens | ................ | E05F 11/06 49/325 |
| 5,970,701 A * | 10/1999 | Roden | ................ | F16G 13/20 59/78 |
| 6,224,037 B1 * | 5/2001 | Novick | ................ | B66F 3/06 254/95 |
| 6,419,603 B1 * | 7/2002 | Grasl | ................ | B66F 3/06 474/148 |
| 6,536,583 B2 * | 3/2003 | Luigi | ................ | B65G 23/16 198/832 |
| 6,936,042 B2 * | 8/2005 | Wallace | ................ | A61B 34/71 606/1 |
| 7,370,896 B2 * | 5/2008 | Anderson | ................ | B25J 15/0009 294/106 |
| 7,621,078 B2 * | 11/2009 | Phelan | ................ | B66F 3/06 254/DIG. 6 |
| 7,905,156 B2 * | 3/2011 | Scott | ................ | B66D 1/54 74/89.21 |
| 8,069,954 B2 * | 12/2011 | Kempf | ................ | B66F 13/005 187/250 |
| 8,336,286 B2 * | 12/2012 | Veltrop | ................ | B05C 17/0116 222/113 |
| 8,534,004 B2 * | 9/2013 | Wasson | ................ | E04H 12/182 52/114 |
| 2006/0156851 A1 * | 7/2006 | Jacobsen | ................ | B25J 18/06 74/490.01 |
| 2008/0296920 A1 * | 12/2008 | Kipping | ................ | B25B 5/061 294/198 |
| 2009/0031842 A1 * | 2/2009 | Kawai | ................ | A61B 17/29 74/490.01 |
| 2009/0071281 A1 * | 3/2009 | Fisk | ................ | B25J 5/005 74/490.03 |
| 2010/0051424 A1 * | 3/2010 | Suko | ................ | B66F 3/06 198/850 |

* cited by examiner

DIRECT ACTING EXTENSIBLE AND RETRACTABLE ARM MECHANISM, AND ROBOT ARM PROVIDED WITH DIRECT ACTING EXTENSIBLE AND RETRACTABLE ARM MECHANISM

CROSS-REFERENCE TO RELATED APPLICATIONS

This application is a continuation application and thus claims benefit pursuant to 35 U.S.C. §120, of U.S. patent application Ser. No. 13/699,800, which is a national stage application of International Patent Application No. PCT/JP2011/062005 filed on May 25, 2011, which claims priority to Japanese Patent Application No. 2010-124598 filed on May 31, 2010, the entire contents of which are incorporated by reference in their entirety herein.

TECHNICAL FIELD

The present invention relates to a mechanism of a robot arm. Specifically, the present invention relates to (i) a direct acting extensible and retractable arm mechanism which realizes high safety, a compact body, and prevention of entry of dust and the like, and (ii) a robot arm including the direct acting extensible and retractable arm mechanism.

BACKGROUND ART

In recent years, there has been a reduction in population of workers in an aging society with a falling birthrate. Because of such a reduction in population of workers, there has been demand for a robot arm which (i) can manufacture a product in cooperation with a human at a production site or (ii) can support a daily life of an old person or a daily life of a handicapped person.

A robot arm constituted by rotational joints has an arrangement in which a plurality of rotational joints 103 and a plurality of arm sections 102 are, alternately, connected to each other in series between a base 100 and an end effector 101 (see (a) and (b) of FIG. 19). With the arrangement, in a case where a position and orientation of the end effector 101 are determined, rotational angles of the plurality of rotational joints 103 are generally determined uniquely. That is, there is a problem that it is not possible to determine arbitrarily the position of the end effector 101 and a position of each of the rotational joints 103. For this reason, in a case where the end effector 101 is moved from a position illustrated in (a) of FIG. 19 to a position illustrated in (b) of FIG. 19, for example, the plurality of arm sections 102 become close to each other. In this case, there is an increase in risk that an object located in the vicinity of the plurality of arm sections 102 might be sandwiched between the plurality of arm sections 102. Further, since one of the plurality of rotational joints 103 is moved upward in FIG. 19 from a straight line (shown in a dashed line) connecting the base 100 and the end effector 101 to each other, there is an increase in risk that the one of the plurality of rotational joints 103 becomes in contact with, or crashes against an object located in the vicinity of the robot arm. Such an arrangement is not suitably applicable to a robot arm which operates in the vicinity of a person in a daily life or the like.

In order to reduce such risks, there has been proposed a robot arm having a direct acting extensible and retractable arm mechanism which employs a direct acting joint in place of a rotational joint. The direct acting extensible and retractable arm mechanism employs linear extensible and retractable motion, and has been applied to a crane vehicle, a ladder truck, etc. In order to ensure a high rigidity, the linear extensible and retractable arm mechanism, applied to the crane vehicle, the ladder truck, etc., is such that a mechanism of an arm section becomes larger with increasing distance from a hand section toward a root section serving as a base section. Accordingly, it is necessary for the direct acting extensible and retractable arm mechanism, applied to the crane vehicle, the ladder truck, etc., to have the base section and the arm section, both of which are large and heavy.

Further, Patent Literatures 1 through 3 also describe a robot arm having a linear extensible and retractable arm mechanism. However, such a robot arm has danger in a case where the robot arm operates in the vicinity of a human in a daily life or the like. Further, a general direct acting mechanism used in an industrial machine keeps its linear mechanism all the time. For this reason, in a case where the direct acting mechanism is stored, the direct acting mechanism thus stored protrudes from a main body of the robot arm. That is, there remains danger for a human in a case where the direct acting mechanism operates in the vicinity of the human in a daily life or the like.

Patent Literature 4 describes an arm employing a direct extensible and retractable arm mechanism, which arm has a low risk that the arm might be in contact with or crush against an object located in the vicinity of the arm. However, this arm ensures its rigidity only in a direction of gravitational forth. That is, the arm is not suitably used as a robot arm that is used in a daily life or the like, in which (i) realization of an arbitrary position of the arm and an arbitrary posture of the arm are required, and (ii) various operations are required, such as holding an object with an end effector, pressing a button, and exhibiting force not only in the direction of gravitational force but also in directions of 6 axes of a position and a posture. Furthermore, since an overload concentrates on an axis, it is difficult to ensure a high rigidity of the arm. Moreover, since a lot of gaps are formed on an upper surface between links, it is likely that (i) a finger is sandwiched inside the direct acting extensible and retractable arm mechanism and (ii) dust enters inside the direct acting extensible and retractable arm mechanism. That is, this arm cannot be suitably used as a robot ram used in the vicinity of a human in various environments, e.g., when being used in a daily life.

CITATION LIST

[Patent Literature 1]
Japanese Patent Application Publication, Tokukaihei, No. 7-164369 A (1995) (Publication Date: Jun. 27, 1995)
[Patent Literature 2]
Japanese Patent Application Publication, Tokukaisho, No. 61-45168 A (1986) (Publication Date: Mar. 5, 1986)
[Patent Literature 3]
Japanese Patent Application Publication, Tokukaisho, No. 63-84882 A (1988) (Publication Date: Apr. 15, 1988)
[Patent Literature 4]
Japanese Patent Application Publication, Tokukaihei, No. 6-39758 A (1994) (Publication Date: Feb. 15, 1994)

SUMMARY OF INVENTION

Technical Problem

As to a robot arm which (i) operates in the vicinity of a human to (i) produce a product in cooperation with the human at a production site or (ii) operates in the vicinity of an aged person or a handicapped person to support a daily life of the aged person or a daily life of the handicapped person, use of a direct acting extensible and retractable arm mechanism in place of a rotational joint leads to an improvement in safety. However, with such a direct acting extensible and retractable arm mechanism, there are such problems that (i) it is difficult to ensure a high rigidity for each of positions and postures of the direct acting extensible and retractable arm mechanism, (ii) it is difficult to prevent a finger from being sandwiched inside the direct acting extensible and retractable arm mechanism or dust from entering the direct acting extensible and retractable arm mechanism, and (iii) the direct acting extensible and retractable arm mechanism has a large size when being stored.

The present invention is made in view of the problems. An object of the present invention is to provide a direct acting extensible and retractable arm mechanism of a robot arm which can be used safely in the vicinity of a human in a daily life or the like.

Solution to Problem

In general, according to one embodiment, a multi-joint arm mechanism comprising an arm supporting member; a first joint having a first rotational axis parallel to a center axis of the arm supporting member; a second joint having a second rotational axis perpendicular to the center axis of the arm supporting member; and a third joint having a linear extension and retraction axis perpendicular to the second rotational axis. The third joint comprises: a plurality of flat-shaped first structures bendably coupled to one another; a plurality of second structures having a C-shaped section and bendably coupled to one another at bottom parts of the second structures; a supporting member which supports the stiffened first and second structures in such a manner that the first and second structures are movable forward and backward; and a drive member which sends the stiffened first and second structures forward from the supporting member and draws the stiffened first and second structures back. The first structures and the second structures are linearly stiffened by being in contact with each other and return to a bent state by being separated from each other. The second structures are bent toward the bottom parts and conveyed into the arm supporting member from the supporting member. The first structures are bent in a same direction as the second structures, and conveyed into the arm supporting member from the supporting member. The second structures are stored in the arm supporting member. The first structures are stored in the arm supporting member along the second structures.

Additional objects, features, and strengths of the present invention will be made clear by the description below. Further, the advantages of the present invention will be evident from the following explanation in reference to the drawings.

DESCRIPTION OF EMBODIMENTS

A direct acting extensible and retractable arm mechanism of the present invention can (i) ensure a high rigidity for all positions and all postures of an arm section which is extensible and retractable directly from one of ends of a robot arm supporting member, (ii) prevent a finger or the like from being sandwiched or prevent dust from entering the arm section, and (iii) have a reduction in size when being stored. For these reasons, the direct acting extensible and retractable arm mechanism can be applied not only to a robot arm for supporting safely a daily life of a handicapped person or a daily life of an aged person, in the vicinity of that person, but also to, for example, a next-generation robot arm for cellular manufacturing, which operates in cooperation with a human.

One embodiment of the present invention is described below with reference to FIGS. 1 through 10. Note that the entire direct acting extensible and retractable arm mechanism may be regarded as a single operational joint, and may be referred to as "direct acting extensible and retractable arm joint J3", in some cases.

Figure 1:
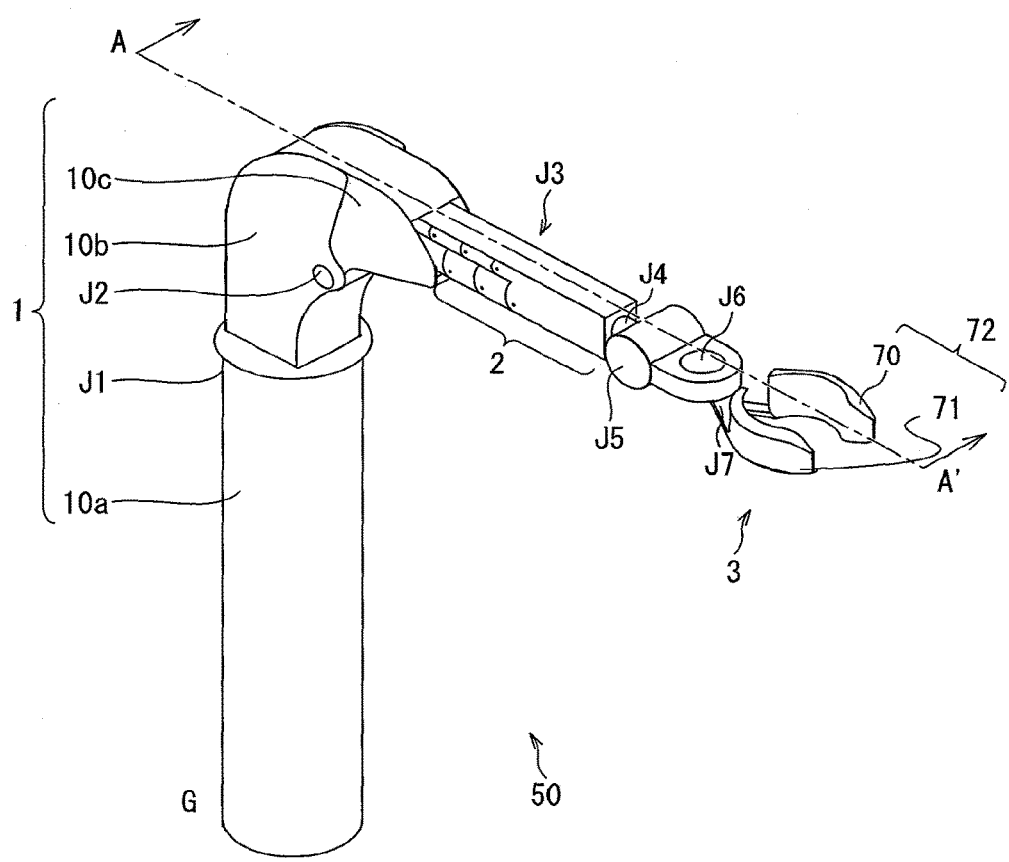
FIG. 1 is a perspective view illustrating an outer appearance of a robot arm in accordance with an embodiment of the present invention.

FIG. 1 is a perspective view illustrating an outer appearance of a robot arm, which is one embodiment of the direct acting extensible and retractable arm mechanism of the present invention. A robot arm 50 includes: a robot arm supporting member 1 (base); an arm section 2; and a hand section 3 (end effector) (see FIG. 1).

[Robot Arm Supporting Member]

The robot arm supporting member 1 has a structure that extends, from an installation surface G on which the robot arm 50 is installed, in a direction vertical to the installation surface G. The robot arm supporting member 1 supports the entire robot arm 50 (see FIG. 1). The robot arm supporting member 1 includes a first supporting section 10a, a second supporting section 10b, a third supporting section 10c, a first rotational joint J1 (rotational joint means), and a second rotational joint J2 (see FIG. 1).

The first supporting section 10a and the second supporting section 10b have a hollowed shape (see FIG. 1). The first supporting section 10a and the second supporting section 10b are arranged in a lower position and an upper position, respectively, so that a center axis (supporting axis) of the first supporting section 10a and a center axis (supporting axis) of the second supporting section 10b match each other. The third supporting section 10c also has a hollowed structure, which is in communication with both the hollowed structure of the first supporting section 10a and the hollowed structure of the second supporting section 10b. A part of constituent elements of the arm section 2 (later described) is arranged so as to be storable inside these sections, that is, the first supporting section 10a, the second supporting section 10b, and the third supporting section 10c.

The first rotational joint J1 is provided between the first supporting section 10a and the second supporting section 10b, and is constituted as a rotational joint whose rotational axis is a center axis (the center axis of the first supporting section 10a and the center axis of the second supporting section 10b) of the robot arm supporting member 1. Rotation of the first rotational joint J1 causes the second supporting section 10b, the third supporting section 10c, the arm section 2, and the hand section 3 to be rotated around the rotational axis of the first rotational joint J1.

The second rotational joint J2 is provided at one of ends of the second supporting section 10b on an arm section 2 side (see FIG. 1), and is constituted as a rotational joint whose rotational axis is orthogonal to the axis of the robot arm supporting member 1. Rotation of the second rotational joint J2 causes the third supporting section 10c, the arm section 2, and the hand section 3 to be rotated around the rotational axis of the second rotational joint J2 with respect to the robot arm supporting member 1. Further, the second rotational joint J2 has a certain angle and a certain distance from the center axis of the robot arm supporting member 1 so that an object located around the robot arm 50 would not be tightly sandwiched between the robot arm supporting member 1 and the arm section 2.

According to the present embodiment, the robot arm supporting member 1 extends from the installation surface G in the direction vertical to the installation surface G. Note, however, that the present invention is not limited to this, as long as the robot arm supporting member 1 extends from the installation surface G while having a certain angle with respect to the installation surface G.

[Hand Section]

The hand section 3 is provided at one of ends of the arm section 2. The hand section 3 includes a fourth rotational joint J4, a fifth rotational joint J5, a sixth rotational joint J6, a seventh rotational joint J7, a first finger 70, and a second finger 71 (see FIG. 1). Note that the first finger 70 and the second finger 71 constitute a two-finger hand 72.

The fourth rotational joint J4 is a rotational joint whose rotation axis is a center axis (hereinafter, referred to as "arm axis", in some cases) of the arm section 2, which center axis extends in a direction in which the arm section 2 is extensible and retractable. Rotation of the fourth rotational joint J4 causes the hand section 3 (a part from one of ends of the hand section 3, i.e., the fourth rotational joint J4, to the other one of ends of the hand section 3) to be rotated around the rotational axis of the fourth rotational joint J4.

The fifth rotational joint J5 is a rotational joint whose rotational axis is orthogonal to the arm axis. Rotation of the fifth rotational joint J5 causes the two-finger hand 72 (a part from one of ends of the fifth rotational joint J5 to the other one of ends of the hand section 3) to be rotated around the rotational axis of the fifth rotational joint J5.

The sixth rotational joint J6 is a rotational joint whose rotational axis is orthogonal to both the arm axis and the fifth rotational joint J5. Rotation of the sixth rotational joint J6 causes the two-finger hand 72 to be rotated around the rotational axis of the sixth rotational joint J6. Here, the first finger 70 and the second finger 71 keep a distance between these, and are rotated, in synchronization with each other, around the rotational axis of the sixth rotational joint J6. The seventh rotational joint J7 causes the first finger 70 and the second finger 71 of the two-finger hand 72 to be rotated. That is, the seventh rotational joint J7 can cause one of ends of the first finger 70 and one of ends of the second finger 71 to be rotated, and therefore to be close to each other. In this case, the two-finger hand 72 is closed so as to hold an object. On the other hand, the seventh rotational joint J7 can cause the one of ends of the first finger 70 and the one of ends of the second finger 71 to be rotated, and therefore to be away from each other. In this case, the two-finger hand 72 is opened so as to release the object held by the two-finger hand 72.

According to the present embodiment, the two-finger hand 72 is used as the hand section 3. Note, however, that the present invention is not limited to this, and the hand section 3 may be a hand having not less than three fingers.

Further, the hand section 3 is not limited to a hand having a finger section(s), and any desired sorts of structure, required to be at a desired position or to have a desired posture by use of the arm section, can be connected to the arm section in place of the hand section 3. For example, it is possible to connect a device having an image capturing function to the arm section, in place of the hand section 3.

Note that the scope of the direct acting extensible and retractable arm mechanism of the present invention also encompasses an arrangement in which the hand section 3 is not connected.

[Arm Section]

The arm section 2 includes a direct acting extensible and retractable arm joint J3 illustrated in FIG. 1. The hand section 3 is provided at one of ends of the arm section 2. The hand section 3 is provided with the two-finger hand 72. The robot arm supporting member 1, the arm section 2, and the hand section 3 can cause, in cooperation with each other, the two-finger hand 72 to be moved to a desired position or moved to have a desired posture. In a state illustrated in FIG. 1, the direct acting extensible and retractable arm joint J3 can be extended so as to cause the two-finger hand 72 to be moved to a position away from the robot arm supporting member 1. Alternatively, the direct acting extensible and retractable arm joint J3 can be retracted so as to cause the two-finger hand 72, which is located away from the robot arm supporting member 1, to be moved to be closer to the robot arm supporting member 1.

Figure 2:
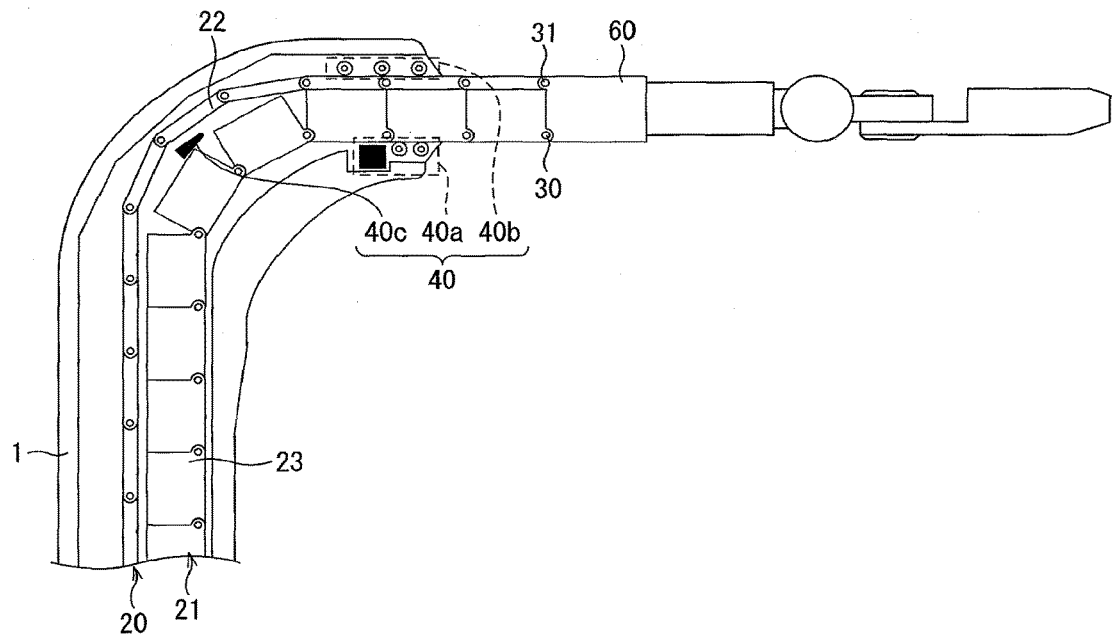
FIG. 2 is a cross-sectional view partially illustrating a direct acting extensible and retractable mechanism in accordance with the embodiment of the present invention.

FIG. 2 is a fragmentary cross-sectional view partially illustrating the robot arm 50, taken along a cutting line of A-A' shown in FIG. 1. As illustrated in FIG. 2, the arm section 2 is mainly constituted by (i) an upper structure group 20 and a lower structure group 21, which constitute the direct acting extensible and retractable arm joint J3, and (ii) drive means 40 (drive mechanism) for driving the direct acting extensible and retractable arm joint J3.

The direct acting extensible and retractable arm joint J3 can constitute the arm section 2 that (i) is stored in the robot arm supporting member 1 extending, from the installation surface 50 on which the robot arm 50 is installed, in the direction vertical to the installation surface 50, and (ii) is extensible from the robot arm supporting member 1 via the third supporting section 10c (see FIG. 1). Here, the direct acting extensible and retractable arm joint J3 is arranged such that the lower structure group 20 is provided at a lower position with respect to the upper structure group 20 in a direction of gravitational force. Overlapping of the upper structure group 20 and the lower structure group 21 causes both the upper structure group 20 and the lower structure group 21 to become rigid, so that the upper structure group 20 and the lower structure group 21 form the arm section 2. The second rotational joint J2 causes the arm section 2 to be rotated around the second rotational joint J2.

(Common Block Member)

A common block member 60 is attached to both (i) one of ends of the upper structure group 20 and (ii) one of ends of the lower structure group 21 (see FIGS. 2, 3, 5, and 7). An upper structure 22, provided adjacent to the common block member 60, is coupled with the common block member 60. A lower structure 23, provided adjacent to the common block member 60, is also coupled with the common block member 60. The common block member 60 has such a shape that a single upper structure 22 and a single lower structure 23 are formed integral with each other. According to the present embodiment, the common block member 60 has such an integral shape. Note, however, that the present invention is not limited to this, as long as the one of ends of the upper structure group 20 and the one of ends of the lower structure group 21 are not away from each other inconveniently in an extending/retracting operation of the direct acting extensible and retractable arm joint J3. Accordingly, it is possible to employ, as the common block member 60, not only the aforementioned member but also such a member that a single upper structure 22 and a single lower structure 23 are attached to each other by use of an adhesive or by welding. Furthermore, it is also possible to employ, as the common block member 60, such a member that a single upper structure 22 and a single lower structure 23 are formed integral with each other by use of a fixing mechanism. Moreover, it is also possible to employ, as the common block member 60, such a member that a single upper structure 22 and a single lower structure 23 are not attached to each other but are pressed with respect to each other to be in contact with each other, and are covered with a cover case.

According to the present embodiment, the common block member 60 has such a shape that the upper structure 22 and the lower structure 23 are formed integral with each other. Note, however, that the present invention is not limited to this. In a case where it is unnecessary to store the common block member 60 in the robot arm supporting member 1 via the third supporting section 10c, it is possible that both the one of ends of the upper structure group 20 and the one of ends of the lower structure group 21 are formed integral with each other, and are connected to a common block member 60 having an arbitrary shape.

Lower Structure Group

The lower structure group 21 is constituted by a plurality of lower structures 23 (see FIG. 2). All the plurality of structures 23 are connected to each other in series (from one of two end lower structures 23 to the other one of two end lower structures 23).

Figure 3:
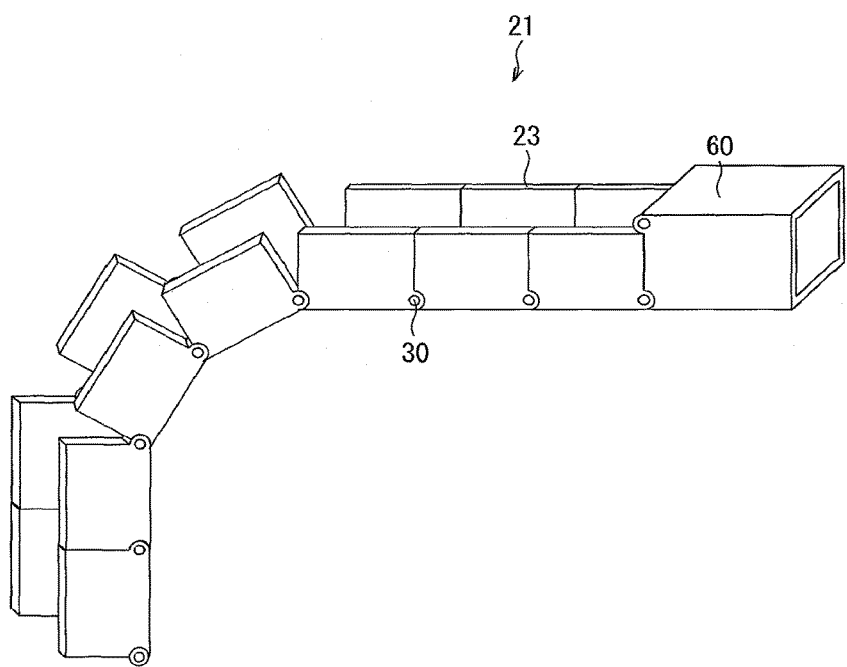
FIG. 3 is a perspective view illustrating an outer appearance of an arrangement of a part of the direct acting extensible and retractable arm mechanism in accordance with the embodiment of the present invention.
Figure 4:
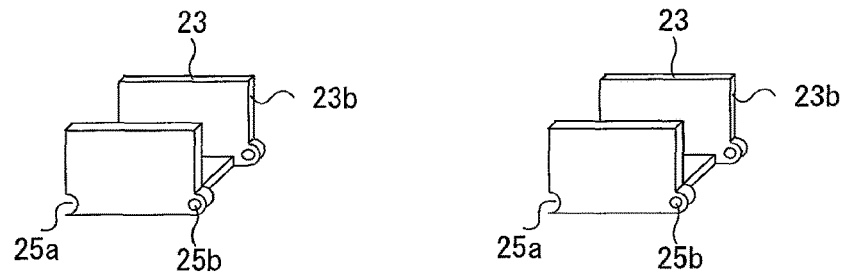
FIG. 4 is a perspective view illustrating an outer appearance of an arrangement of a part of the direct acting extensible and retractable arm mechanism in accordance with the embodiment of the present invention.

Further, adjacent ones of the plurality of lower structures 23 are coupled with each other via a rotational axis (coupling axis) (later described) in a direction orthogonal to the rotational axis. Furthermore, the plurality of lower structures 23 are identical with each other in size (width) in a direction parallel to the coupling axis. The following description deals with details of each of coupling parts of the lower structure group 21 and details of an arrangement of each of the plurality of lower structures 23, with reference to FIGS. 3 and 4. FIG. 3 is a perspective view illustrating an outer appearance of a part of the lower structure group 21. Further, FIG. 4 is a perspective view illustrating an outer appearance of a single lower structure 23. First, the following description deals with a coupling part of the lower structure group 21. Adjacent ones of the plurality of lower structures 23 are coupled with each other via a rotational axis, e.g., a bearing employing a pin 30. Specifically, a lower structure 23 has a through hole 25 at a coupling part between the lower structure 23 and one of adjacent lower structures 23, and a through hole 26 at another coupling part between the lower structure 23 and the other one of the adjacent lower structures 23.

Both the thorough hole 25a and the through hole 25b extend in a direction vertical to a coupling direction. Adjacent ones of the plurality of lower structures 23, each having the above structure, are coupled with each other such that a through hole 25a of one of the adjacent ones of the plurality of lower structures 23 and a through hole 25b of the other one of the adjacent ones of the plurality of lower structures 23 are coupled with each other. That is, the through hole 25a of the one of the adjacent ones of the plurality of lower structures 23 and the through hole 25b of the other one of the adjacent ones of the plurality of lower structures 23 form, in cooperation with each other, a single through hole. A single pin 30 is inserted into the single through hole so that the adjacent ones of the plurality of lower structures 23 are coupled with each other. According to the present embodiment, the coupling part between adjacent ones of the plurality of lower structures 23 is such that (i) one of ends of one of the adjacent ones of the plurality of lower structures 23 has a convex structure having a through hole 25b, (ii) one of ends of the other one of the adjacent ones of the plurality of lower structures 23 has a concave structure having a through hole 25a, and (iii) the convex structure engages with the concave structure so as to form a single through hole (see FIG. 4). Note, however, that the present invention is not limited to this coupling method.

Next, the following description deals with a structure of each of the plurality of lower structures 23. As illustrated in FIGS. 3 and 4, each of the plurality of lower structures 23 is such that, in a case where the lower structure 23 is cut along a plane vertical to a longitudinal direction, a cross-section of the lower structure 23 has a concave shape (where "longitudinal direction" is a direction in which adjacent ones of the plurality of lower structures 23 are coupled with each other, as described later). In the present specification, an opened part of the concave shape is referred to as "opening section". Further, a surface having the opening section is referred to as "upper surface" of the lower structure 23, in some cases. The upper surface indicates a surface which is located at an upper position in the direction of gravitational force, in a case where the adjacent ones of the plurality of lower structures 23 are coupled with each other in a horizontal direction. Under a condition that the adjacent ones of the plurality of lower structures 23 are coupled with each other and arranged linearly, opening sections of the adjacent ones of the plurality of lower structures 23 are also coupled with each other, and therefore form such a single groove that structures having the concave shape are connected to each other. An inner space of the groove can be used effectively as a space in which an electrical line is provided along the groove.

Note that, in a case where it is unnecessary to obtain such an inner space of the groove, it is possible that each of the plurality of lower structures 23 has not such a groove structure but a general block structure.

Figure 9:
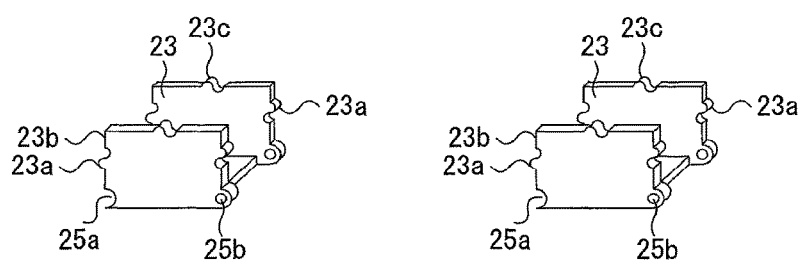
FIG. 9 is a cross-sectional view illustrating a modified example of the direct acting extensible and retractable arm mechanism in accordance with the embodiment of the present invention.

Further, surfaces of adjacent ones of the plurality of lower structures 23, which surfaces face each other, can have, respectively, side surface convex-concave structures 23a (alignment sections) which engage with each other (see FIG. 9). A side surface convex-concave structure 23a of one of adjacent ones of the plurality of lower structures 23 engages with a side surface convex-concave structure 23a of the other one of the adjacent ones of the plurality of lower structures 23, so that the adjacent ones of the plurality of lower structures 23 can be prevented significantly from being out of alignment in a coupling direction, at a coupling part between the adjacent ones of the plurality of lower structures 23, due to rotation around a rotational axis in the coupling direction (see FIG. 9). This makes it possible to further increase a rigidity of a combined structure of an upper structure and a lower structure.

Furthermore, since the surfaces of the adjacent ones of the plurality of lower structures 23, which surfaces face each other, have side surfaces 23b, respectively. Since the side surfaces 23b are provided, it is possible to prevent the adjacent ones of the plurality of lower structures 23 from being changed from (i) a state where the adjacent ones of the plurality of lower structures 23 are arranged to be connected to each other in series while concave opening sections of the adjacent ones of the plurality of lower structures 23 face in the same direction to (ii) a state where the adjacent ones of the plurality of lower structures 23 are rotated to form a V shape while the concave opening sections faces "inward" with respect to each other.

Meanwhile, it is possible to cause the adjacent ones of the plurality of lower structures 23 to be changed from (i) the state where the adjacent ones of the plurality of lower structures 23 are arranged to be connected to each other in series while concave opening sections of the adjacent ones of the plurality of lower structures 23 face in the same direction to (ii) a state where the adjacent ones of the plurality of lower structures 23 are rotated to form a V shape while the concave opening sections of the adjacent ones of the plurality of lower structures 23 face "outward" with respect to each other.

Moreover, it is possible that (i) adjacent ones of the plurality of lower structures 23 of the lower structure group 21 engage with each other via their side surfaces, and therefore (ii) a surface of the lower structure group 21, which surface faces the upper structure group 20, becomes a plane surface having no gap. This arrangement can (i) prevent an object from being sandwiched between adjacent ones of the plurality of lower structures 23 and (ii) prevent dust from entering a space between adjacent ones of the plurality of lower structures 23. Further, an edge section is formed around each of opening sections of the plurality of lower structures 23, and is in contact with the upper structure group 22 (later described). The edge section has an upper surface convex-concave structure 23c (engaging section) (see FIG. 9). The upper surface convex-concave structure 23c is arranged so as to engage with a bottom surface convex-concave structure 22a of each of the plurality of upper structures 22 (later described) (see FIG. 10). Note that, in a case where a gear roller is attached, as a pressing roller 41, to a bottom surface of a part where the plurality of lower structures 23 of the lower structure group 21 are arranged to be connected to each other in series in the horizontal direction, or in a case where an arrangement which is the same as a gear 34 is provided in place of the pressing roller 41, a bottom surface convex-concave structure 23d which engages with such a gear is provided on the bottom surface of each of the plurality of lower structures 23.

Upper Structure Group

The upper structure group 20 is constituted by plurality of upper structures 22 (see FIG. 2). All the plurality of upper structures 22 are connected to each other in series (from one of two end upper structures 22 to the other one of two end upper structures 22). Further, adjacent ones of the plurality of upper structures 22 are coupled with each other via a rotational axis (coupling axis) (later described) in a direction orthogonal to the rotational axis. Furthermore, the plurality of upper structures 22 are identical with each other in size (width) in a direction parallel to the coupling axis. The following description deals with details of a coupling part of adjacent ones of the plurality of upper structures 22, and an arrangement of each of the plurality of upper structures 22, with reference to FIGS. 5 and 6.

Figure 5:
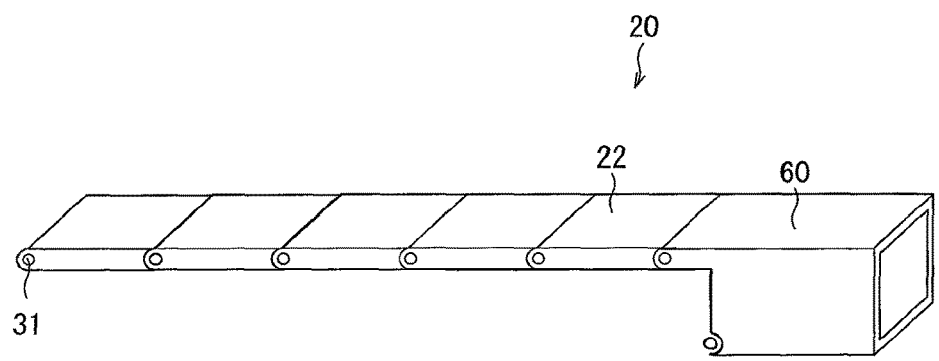
FIG. 5 is a perspective view illustrating an outer appearance of an arrangement of a part of the direct acting extensible and retractable arm mechanism in accordance with the embodiment of the present invention.
Figure 6:
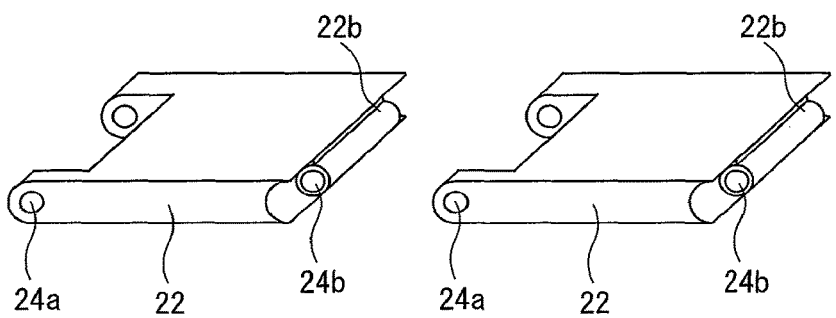
FIG. 6 is a perspective view illustrating an outer appearance of an arrangement of a part of the direct acting extensible and retractable arm mechanism in accordance with the embodiment of the present invention.

FIG. 5 is a perspective view illustrating an outer appearance of a part of the plurality of upper structures 22. Moreover, FIG. 6 is a perspective view illustrating an outer appearance of a single upper structure 22.

First, the following description deals with each of coupling parts of the upper structure group 20. Adjacent ones of the plurality of upper structures 22 are coupled with each other via a rotational axis, such as a bearing employing a pin 31 (see FIG. 5). Specifically, each of the plurality of upper structures 22 has such a structure that (i) a part of the upper structure 22, which part is adjacent to one of adjacent structures 22, has a through hole 24a, (ii) another part of the upper structure 22, which another part is adjacent to the other one of adjacent upper structure 22, has a through hole 24b, and (iii) both the through hole 24a and the through hole 24b extend in a direction vertical to the coupling direction.

A through hole 24*a* of one of adjacent ones of the plurality of upper structures 22 and a through hole 24*b* of the other one of adjacent ones of the plurality of upper structures 22 engage with each other, so as to form a single through hole. A single pin 31 is inserted into the single through hole, so that the adjacent ones of the plurality of upper structures 22 are coupled with each other. According to the present embodiment, the coupling part between adjacent ones of the plurality of upper structures 22 is such that (i) a part of one of the adjacent ones of the plurality of upper structures 22, which part is adjacent to the other one of the adjacent ones of the plurality of upper structures 22, has a convex structure having a through hole 24*a*, and (ii) a part of the other one of the adjacent ones of the plurality of upper structures 22, which part is adjacent to the one of the adjacent ones of the plurality of upper structures 22, has a concave structure having a through hole 24*b* (see FIG. 6).

The convex structure engages with the concave structure so as to form a single through hole. Note, however, that the present invention is not limited to this coupling method.

Adjacent ones of the plurality of upper structures 22, coupled with each other, are rotatable with respect to each other around the pin 31 (see FIG. 5) serving as a rotational axis.

Each of the plurality of upper structures 22 has a side surface 22*b* which faces an adjacent upper structure 22 (see FIG. 6). The provision of the side surface 22*b* makes it possible that the adjacent ones of the plurality of upper structures 22 are changed from (i) a state where the adjacent ones of the plurality of upper structures 22 are arranged to be connected to each other in series to (ii) a state where one of the adjacent ones of the plurality of upper structures 22 is rotatable with respect to the other one of the adjacent ones of the plurality of upper structures 22 in such a range that the adjacent ones of the plurality of upper structures 22 form a V shape in a direction opposite to the direction of gravitational force.

Meanwhile, the adjacent ones of the plurality of upper structures 22 is not changed from (i) the state where the adjacent ones of the plurality of upper structures 22 are arranged to be connected to each other in series to (ii) a state where the adjacent ones of the plurality of upper structures 22 form a V shape in the direction of gravitational force. Accordingly, the adjacent ones of the plurality of upper structures 22 of the upper structure group 20 engage with each other via their side surfaces, so that a surface of the upper structure group 20, which surface faces and in contact with a surface of the lower structure group 21, becomes a plane surface having no gap. For this reason, it is possible to (i) prevent an object from being sandwiched between adjacent ones of the plurality of upper structures 22, and (ii) prevent dust from entering a space between adjacent ones of the plurality of upper structures 22. Further, it is possible to increase a rigidity of the arm section 2.

Furthermore, a range of rotational movement of the plurality of upper structures 22 is not limited to the range described above, in a case where a reduction in a property of preventing entry of dust and a reduction in rigidity are accepted.

Next, the following description deals with an arrangement of each of the plurality of upper structures 22. As illustrated in FIGS. 5 and 6, each of the plurality of upper structures 22 generally has a plate shape, and has a through hole 24*a* at one of ends of the upper structure 22, and through hole 24*b* at the other one of ends of the upper structure 22, as described above. In a case where a direction in which adjacent ones of the plurality of upper structures 22 are coupled with each other is referred to as "longitudinal direction" (as described below), a single upper structure 22 has the through hole 24*a* at one of its ends in the longitudinal direction and the through hole 24*b* at the other one of its ends in the longitudinal direction.

Figure 10:
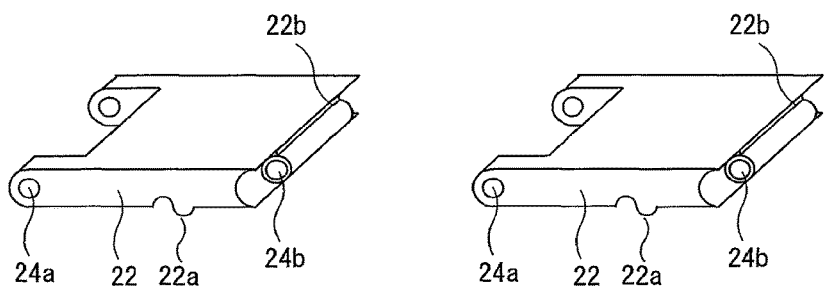
FIG. 10 is a cross-sectional view illustrating a modified example of the direct acting extensible and retractable arm mechanism in accordance with the embodiment of the present invention.

Furthermore, it is possible that a bottom surface of each of the plurality of upper structures 22 has a bottom surface convex-concave structure 22*a*, which engages with an upper surface convex-concave structures 23*c* provided on an upper surface of a corresponding one of the plurality of lower structures 23 (see FIG. 10). In this case, it is possible to (i) prevent significantly an upper structure 22 and a lower structure 23 from being out of alignment with respect to each other in the coupling direction and (ii) further increase a rigidity of a combined structure of the upper structure 22 and the lower structure 23.

Note that, in a case where a gear roller is provided, as a pressing roller 42 (later described), on an upper surface of a part where the plurality of upper structures 22 of the upper structure group 20 are arranged to be connected to each other in series in the horizontal direction, or in a case where an arrangement which is the same as the gear 34 (not illustrated) is provided in place of the pressing roller 42, an upper surface convex-concave structure which engages with such a gear can be formed on the upper surface of each of the plurality of upper structures 22.

Drive Means

The drive means 40 has the following functions: (1) forming a combined structure of the plurality of upper structures 22 and the plurality of lower structures 23, which structure extends directly and is rigid; and (2) releasing such a direct rigid combined structure. The above (1) is obtained in such a manner that the lower structure group 21, in which adjacent ones of the plurality of lower structures 23 are in contact with each other, coupled with each other via their side surfaces 23*b* (illustrated in FIGS. 4 and 7), and arranged in the horizontal direction, is arranged under the upper structure group 20, in which adjacent ones of the plurality of upper structures 22 are in contact with each other, coupled with each other via their side surfaces 22*b* (illustrated in FIG. 6), and are arranged in the horizontal direction. The above (2) is obtained in such a manner that the upper structure group 20 of the direct rigid combined structure of the plurality of upper structures 22 and the plurality of lower structures 23 is detached from the lower structure group 21 which is provided adjacent to the upper structure group 20.

Figure 7:
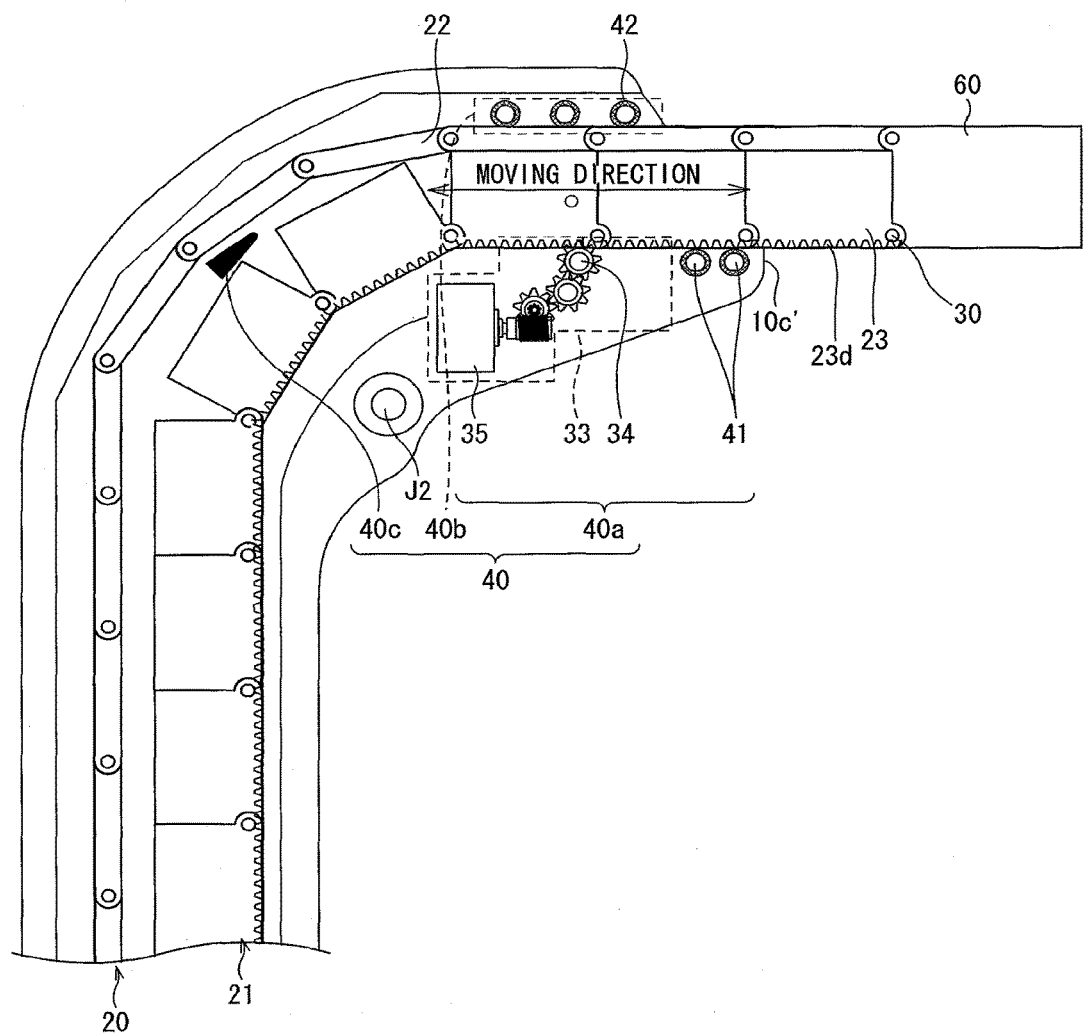
FIG. 7 is a cross-sectional view partially illustrating the direct acting extensible and retractable arm mechanism in accordance with the embodiment of the present invention.
Figure 8:
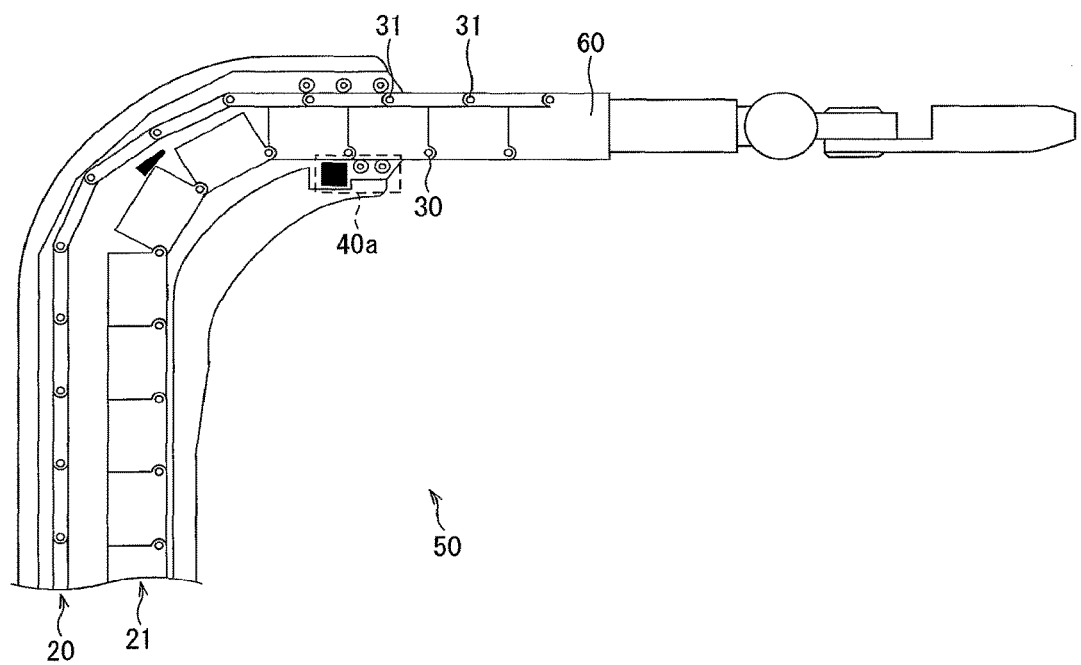
FIG. 8 is a cross-sectional view illustrating a modified example of the direct acting extensible and retractable arm mechanism in accordance with the embodiment of the present invention.

With such functions, the rigid combined structure of the plurality of upper structures 22 and the plurality of lower structures 23, connected in series, is realized as the arm section 2 protruding from an opening section 10*c'* illustrated in FIG. 7, and can change its length (extension and retraction of the direct acting extensible and retractable joint J3) arbitrarily. Hereinafter, a length of a part of the combined structure of the plurality of upper structures 22 and the plurality of lower structures 23, which part protrudes from the opening section 10*c'*, is referred to as "arm length", in some cases.

The drive means 40 includes drive means 40*a* for causing the lower structure group 21 to operate, and separation means 40*c* (see FIG. 2). Note that, in place of the arrangement employing the drive means 40*a* for causing the lower structure group to operate and the separation means 40*c*, the drive means 40 can have an arrangement employing drive means 40*b* (see FIG. 7) for causing the upper structure group 20 to operate and the separation means 40*c*.

Further, in order to cause operations of the upper structure group 20 and the lower structure group 21 to be in synchronization with each other completely, the drive means 40 can include all of the drive means 40a for the lower structure group, the drive means 40b for the upper structure group, and the separation means 40c.

The drive means 40a for the lower structure group is provided in the vicinity of the opening section 10c' of the third supporting section 10c so as to cause the lower structure group 21 to move in an axial direction.

The following description deals with details of the drive means 40a for the lower structure group with reference to FIG. 7. The drive means 40a for the lower structure group includes a gear 34 which engages with a bottom surface convex-concave structure 23a of each of the plurality of lower structures 23, and a drive mechanism 33 which is constituted by an actuator 35 for driving the gear 34 (see FIG. 7).

Furthermore, the drive means 40a for the lower structure group can include a pressing roller (pressing member) 41.

The drive means 40b for the upper structure group is provided in the vicinity of the opening section 10c' of the third supporting section 10c so as to cause the upper structure group 20 to move in the axial direction. The following description deals with details of the drive means 40b for the upper structure group. The drive means 40b for the upper structure group includes a gear which engages with an upper surface convex-concave structure of each of the plurality of upper structures 22, and a drive mechanism which is constituted by an actuator for driving the gear. Further, the drive means 40b for the upper structure group can include a pressing roller (pressing member) 42.

Note that, in place of the arrangement described above, the drive mechanism 33 can have an arrangement employing (i) a worm gear reducer constituted by a combination of the bottom surface convex-concave structure 23b of each of the plurality of lower structures 23 and a worm gear, and (ii) an actuator for driving the worm gear.

Alternately, in place of the arrangement described above, the drive mechanism constituting the drive means 40b for the upper structure group can have an arrangement employing (i) a worm gear reducer constituted by a combination of the upper surface convex-concave structure of each of the plurality of upper structures 22 and a worm gear, and (ii) an actuator for driving the worm gear. According to such an arrangement, it is possible to achieve a large gear ratio with the use of gears the number of which is significantly smaller (several gears) than the number of gears of a gear reducer employing general spur gears. It is therefore possible to realize a gear reducer having a significantly compact body. Further, this arrangement has no back drivability. For this reason, the arm section 2 is operated only by the actuator 35, and even if external force is provided to operate the arm section 2, the arm section 2 would not be operated.

As illustrated in FIG. 7, the pressing roller (pressing member) 41 of the drive means 40a for the lower structure group is provided to be closer to the opening section 10c' of the third supporting section, as compared with the drive mechanism 33.

The pressing roller 41 (i) presses, in a direction opposite to the direction of gravitational force, a bottom surface of the lower structure group 21 (lower structures 23) which is linearly arranged and is to be outputted by the drive mechanism 33 from the opening section 10c', and (ii) outputs the lower structure group 21 to the outside from the opening section 10c'.

Furthermore, the pressing roller (pressing member) 42 of the drive means 40b for the upper structure group is also provided to be closer to the opening section 10c' of the third supporting section 10c, as compared with the drive mechanism. The pressing roller 42 (i) presses, in the direction of gravitational force, an upper surface of the upper structure group 20 (the upper structures 22) which is linearly arranged and is to be outputted from the opening section 10c' by the drive mechanism, and (ii) outputs the upper structure group 20 from the opening section 10c' to the outside.

The rigid combined structure of the plurality of upper structures 22 and the plurality of lower structures 23, i.e., the arm section, is established in such a manner that the plurality of upper structures 22 and the plurality of lower structures 23 are pressed with respect to each other (in overlapping directions) by use of the pressing roller 41 and the pressing roller 42 and, as a result, are in contact with each other.

Note that the arm section can be held by the pressing roller 42 and the gear 34 for driving the plurality of lower structures 23.

Further, the arm section can be held by the pressing roller 41 and the gear for driving the plurality of upper structures 22.

Furthermore, the arm section can be held by the gear for driving the plurality of upper structures 22 and the gear 34 for driving the plurality of lower structures 23. Moreover, the arm section can be held by the pressing roller 41, the pressing roller 42, and the gear 34 for driving the plurality of lower structures 23.

Further, the arm section can be held by the pressing roller 41, the pressing roller 42, and the gear for driving the plurality of upper structures 22.

Furthermore, the arm section can be held by the pressing roller 41, the gear for driving the plurality of upper structures 22, and the gear 34 for driving the plurality of lower structures 23.

Moreover, the arm section can be held by the pressing roller 42, the gear for driving the plurality of upper structures 22, and the gear 34 for driving the plurality of lower structures 23.

A mechanism of each of the pressing roller 41 is not particularly limited. However, as an example, the pressing roller has an arrangement in which an elastic member such as a spring is additionally attached to a rotational axis of a roller.

Two pressing rollers 41 are provided along the upper structure group 20 in FIG. 7. Note, however, that the number of pressing rollers 41 is not limited to this.

Further, in the present embodiment, as illustrated in FIGS. 2 and 7, the two pressing rollers 41 of the drive means 40a for the lower structure group are provided to be closer to the opening section 10c', as compared with the drive mechanism 33 of the drive means 40a for the lower structure group.

Note, however, that the present invention is not limited to this. The drive mechanism 33 can be provided to be closer to the opening section 10c' than the two pressing rollers 41 are.

Next, the drive means 40b for the upper structure group is provided in the vicinity of the opening section 10c' of the third supporting section 10c, so as to cause the upper structure group 20 to be moved. The drive means 40b for the upper structure group includes the pressing roller (pressing members) 42.

The pressing roller 42 can press the upper structure group 20 (upper structures 22) in the direction of gravitational force. A mechanism of the pressing rollers 42 is not particularly limited. However, as an example, the pressing roller 42 can have an arrangement in which an elastic member such as a spring is additionally attached to a rotational axis of a pressing roller.

Three pressing rollers 42 are provided along the upper structure group 20 in FIGS. 2 and 7. Note, however, that the number of pressing rollers 42 is not limited to this.

Further, in addition to the three pressing rollers 42, it is also possible to provide, in a position opposite to an upper surface of the upper structure group 20, a member having the same arrangement as that of the drive mechanism. 33 of the drive means 40a for the lower structure group. In this case, the upper surface of the upper structure group 20 has the upper surface convex-concave structure.

The following description deals with, with reference to FIG. 7, (i) how the upper structure group 20 and the lower structure group 21 are combined with each other by driving carried out by the drive means 33 and (ii) how the direct rigid combined (pressed) structure of the plurality of upper structures 22 and the plurality of lower structures 23 is formed.

As described above, the upper structure group 20 is such that the plurality of upper structures 22 are arranged to be connected to each other in series, and the lower structure group 21 is such that the plurality of lower structures 23 are arranged to be connected to each other in series.

In a case where positions of coupling axes of the upper structure group 20 and positions of coupling axes of the lower structure group 21 correspond to each other in the longitudinal direction (as illustrated in FIGS. 2 and 7), that is, in a case where, in the arm section in which both of the upper structure group 20 and the lower structure group 21 are rigid, the coupling axes of the lower structure group 21 are positioned below the respective coupling axes of the upper structure group 20 in the direction of gravitational force, (i) the upper structure group 20 and the lower structure group 21 are supported in a position close to the opening section 10c' of the third supporting section 10c, and (ii) one of ends of the upper structure group 20 and one of ends of the lower structure group 21 are connected to a common block member 60.

It is thus possible to realize such a rigid state of the arm section 2.

The present invention is not limited to the arrangement in which the coupling axes of the lower structure group 21 are positioned below the respective coupling axes of the upper structure group 20 in the direction of gravitational force. It is also possible to have such an arrangement that each of the coupling axes of the plurality of upper structures 22 is provided in the vicinity of a center of a corresponding one of the plurality of lower structures 23 and each of the coupling axes of the plurality of lower structures 23 are provided in the vicinity of a center of a corresponding one of the plurality of upper structures 22 (see FIG. 8), that is, in the arm section in which both the upper structure group 20 and the lower structure group 21 are rigid, each of the coupling axes of the lower structure group is provided below a space between adjacent ones of the coupling axes of the upper structure group 20 in the direction of gravitational force.

In this case, it is possible to prevent successfully both the plurality of upper structures 22 of the upper structure group 20 and the plurality of lower structures 23 of the lower structure group 21 from being flexed and rotated. This makes it possible to cause the combined structure to have a greater rigidity.

(Storage of Arm Section)

Most of the rigid combined structure of the plurality of upper structures 22 and the plurality of lower structures 23, that is, most of the arm section, protrudes from the opening section 10c' of the third supporting section 10c to an outside in the axial direction. Meanwhile, a part of the upper structure group 20 and a part of the lower structure group 21, both of which do not constitute the rigid combined structure, are (i) arranged to be curved along a shape of the robot arm supporting member 1 (see FIG. 1), and (ii) stored inside inner space of the robot arm supporting member 1.

In order to retract an extended combined structure of the plurality of upper structures 22 and the plurality of lower structures 23, the gear 34 of the drive mechanism 33 is rotated so as to retract the combined structure of the plurality of upper structures 22 and the plurality of lower structures 23 into an inside of the third supporting section 10c. Inside the third supporting section 10c, the separation means 40c is provided at a position sandwiched between the upper structure group 20 and the lower structure group 21 (see FIGS. 2 and 7). The combined structure of the plurality of upper structures 22 and the plurality of lower structures 23 is retracted into the inner space of the third supporting section 10c, so that a combined part of the combined structure is released by insertion of the separation means 40c into the combined part. The combined structure is thus separated into two parts. By further retracting the combined structure of the plurality of upper structures 22 and the plurality of lower structures 23 into the inside of the third supporting section 10c, the upper structure group 20 and the lower structure group 21 are moved from the third supporting section 10c to the second supporting section 10b, and then are stored in the first supporting section 10a.

In a case where the combined structure of the plurality of upper structures 22 and the plurality of lower structures 23 is stored, the upper structure group 20 separated by the separation means 40c is moved above the separation means 40c. The upper structure group 20 thus separated is such that each of the plurality of upper structures 20 can rotate around a pin 30 serving as a rotational axis. Accordingly, the upper structure group 20 is stored in the arm supporting member 1 along a shape of the arm supporting member 1. The lower structure group 21 thus separated is such that each of the plurality of lower structures 21 can rotate around a pin serving as a rotational axis. Accordingly, the lower structure group 21 is stored in the arm supporting member 1 along the shape of the arm supporting member 1. As such, since both the upper structure group 20 and the lower structure group 21 can be stored in the arm supporting member 1 along the shape of the arm supporting member 1, it is possible to have a reduction in size of the arm section 2 in a case where the arm section 2 is stored.

(Condition for Rigid Structure of Arm Section)

According to the present embodiment, as illustrated in FIGS. 2 and 7, the rigid structure of the arm section 2 is realized on the following conditions (i) through (iv): (i) one of ends of the upper structure group 20 and one of ends of the lower structure group 21 are connected to the common block member 60, (ii) a part of the upper structure group 20, protruding from the opening section 10c' of the third supporting section 10c to the outside, and a part of the lower structure group 21, protruding from the opening section 10c' to the outside, are kept being identical with each other in length all the time, (iii) the lower structure group 21 is such that, in a case where the plurality of lower structures 23 of lower structure group 21 are arranged to be connected to each other in series, each of the plurality of lower structures 23 can be rotated around a pin 30, serving as a rotational axis, forward in the direction of gravitational force but cannot be rotated backward, and (iv) the upper structure group 22 is such that, in a case where the plurality of upper structures 22 of the upper structure group 20 are arranged to be connected to each other in series, each of the plurality of upper structures 22 can be rotated around a pin 31, serving as a rotational axis, forward and backward.

In order to realize such a condition that (i) the one of ends of the upper structure group 20 and the one of ends of the lower structure group 21 are connected to the common block member 60, and, in this state, (ii) the part of the upper structure group 20, protruding from the opening section 10c' of the third supporting section 10c to the outside, and the part of the lower structure group 21, protruding from the opening section 10c' to the outside, are kept being identical with each other in length, it is necessary to cause the operation of the upper structure group 20, driven by the drive means 40b for the upper structure group, and the operation of the lower structure group, driven by the drive means 40a for the lower structure group, to be in synchronization with each other.

Further, it is possible that (i) the operation of the upper structure group 20 is controlled by the drive means 40b for driving the upper structure group 20, and (ii) the operation of the lower structure group 21 is controlled by an engaged structure of the bottom surface convex-concave structure 22a of each of the plurality of upper structures 22 and the upper surface convex-concave structure 23c of the each of the plurality of lower structures 23.

Furthermore, it is possible that (i) the operation of the lower structure group 21 is controlled by the drive means 40a for driving the lower structure group 21, and (ii) the operation of the upper structure group 22 is controlled by an engaged structure of the bottom surface convex-concave structure 22a of each of the plurality of upper structures 22 and the upper surface convex-concave structure 23c of each of the plurality of lower structures 23.

Moreover, it is also possible that (i) the operation of the upper structure group 20 is controlled by the drive means 40b for driving the upper structure group 20, and (ii) the operation of the lower structure group 21 is not controlled by the drive means 40a for driving the lower structure group 21 but the engaged structure of the bottom surface convex-concave structure 23a of each of the plurality of upper structures 22 and the upper surface convex-concave structure 23c of each of the plurality of lower structures 23.

Further, it is possible that (i) the operation of the upper structure group 20 is not controlled by the drive means 40b for driving the upper structure group 20, and (ii) the operation of the lower structure group 21 is controlled by the drive means 40a for driving the lower structure group 21, and (iii) the operation of the lower structure group 21 is controlled by the engaged structure of the bottom surface convex-concave structure 22a of each of the plurality of upper structures 22 and the upper surface convex-concave structure 23c of each of the plurality of lower structures 23.

Furthermore, it is also possible that, in order to have an increase in rigidity of the arm section 2, (i) the operation of the upper structure group 20, driven by the drive means 40b for the upper structure group, and the operation of the lower structure group 22, driven by the drive means 40a for the lower structure group, are caused to be in synchronization with each other, and (ii) the operation of the upper structure group 22 is controlled by the engaged structure of the bottom surface convex-concave structure 22a of each of the plurality of upper structures 22 and the upper surface convex-concave structure 23c of each of the plurality of lower structures 23.

(Modified Example of Arm Section)

In the present embodiment, the direct acting extensible and retractable arm joint J3 is constituted by the upper structure group 20 and the lower structure group 21 (see FIG. 2). Note, however, that the present invention is not limited to this. The present invention can have either an arrangement illustrated in FIG. 11 or an arrangement illustrated in FIG. 13. The following description deals with the arrangement illustrated in FIG. 11 and the arrangement illustrated in FIG. 13. The arrangement illustrated in FIG. 11 is different from the arrangement illustrated in FIG. 2 in that the upper structure group 21 of the direct acting extensible and retractable arm joint J3 illustrated in FIG. 2 is replaced with a different structure.

Specifically, a lower structure 28 (see FIG. 12) is substantially similar to the lower structure 23 illustrated in FIG. 2 but the upper structure 22 illustrated in FIG. 2, having substantially a plate structure, is replaced with an upper structure 27 (see FIG. 12) having a block structure.

Figure 11:
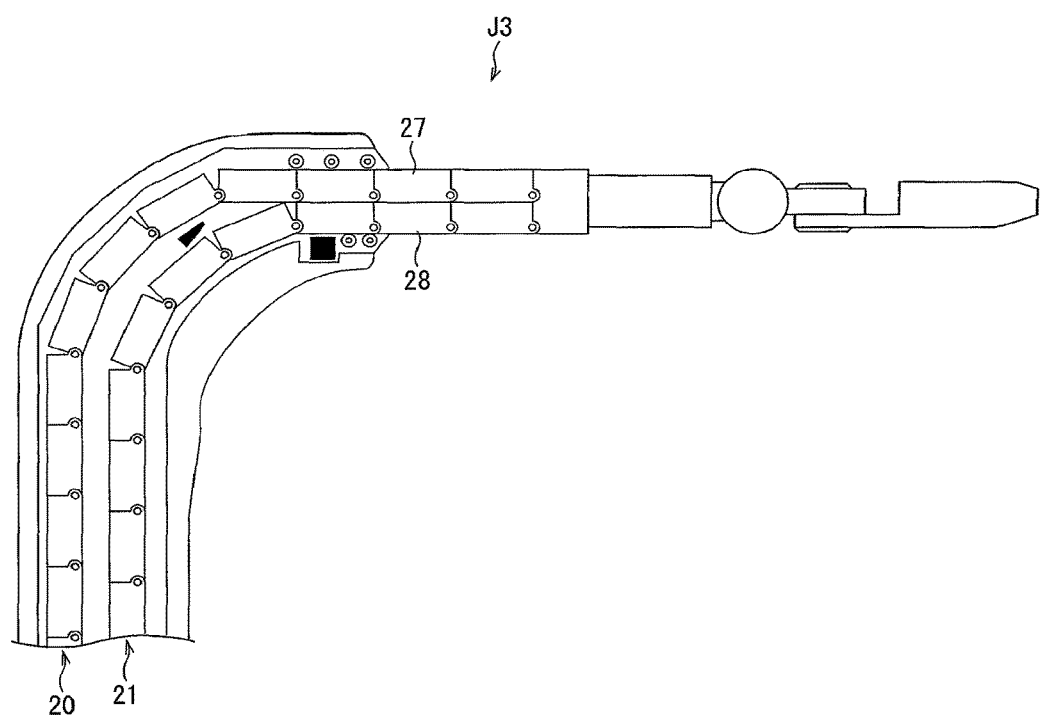
FIG. 11 is a cross-sectional view illustrating a modified example of the direct acting extensible and retractable arm mechanism in accordance with the embodiment of the present invention.

The arrangement illustrated in FIG. 11 is such that (i) the lower structure group constituted by a plurality of lower structures 28 is such that, in a case where the plurality of lower structures 28 of the lower structure group are arranged to be connected to each other in series, each of the plurality of lower structures 28 can be rotated around a pin, serving as a rotational axis, forward in the direction of gravitational force but cannot be rotated backward, and (ii) the upper structure group constituted by a plurality of upper structures 27 is such that, in a case where the plurality of upper structures 27 of the upper structure group are arranged to be connected to each other in series, each of the plurality of upper structures 27 can be rotated around a pin, serving as a rotational axis, either forward and backward in the direction of gravitational force or not backward but only forward in the direction of gravitational force.

Figure 12:
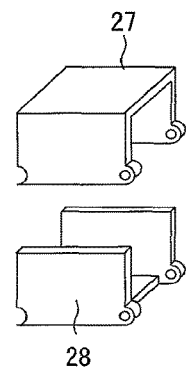
FIG. 12 is a cross-sectional view illustrating a modified example of the direct acting extensible and retractable arm mechanism in accordance with the embodiment of the present invention.
Figure 13:
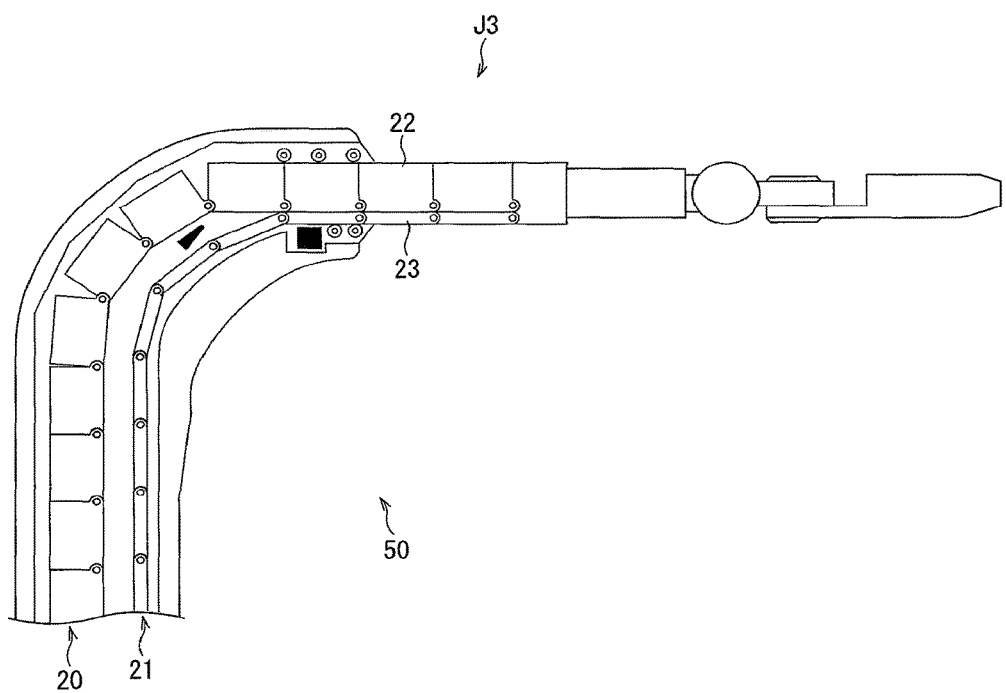
FIG. 13 is a cross-sectional view illustrating a modified example of the direct acting extensible and retractable arm mechanism in accordance with the embodiment of the present invention.

FIG. 13 illustrates an arrangement in which the arrangement of the plurality of upper structures 22 and the arrangement of the plurality of lower structures 23, illustrated in FIG. 2, are reversed in an up-and-down direction. Each of the plurality of upper structures 22 illustrated in FIG. 2 has substantially a plate structure, whereas each of a plurality of upper structures illustrated in FIG. 13 has a block structure which is similar to that of the upper structure 27 illustrated in FIG. 12. Each of the plurality of lower structures 23 illustrated in FIG. 2 has a block structure, whereas each of a plurality of lower structures illustrated in FIG. 13 has a substantially a plate structure. The arrangement illustrated in FIG. 13 is such that (i) a lower structure group constituted by the plurality of lower structures is such that, in a case where the plurality of lower structures of the lower structure group are arranged to be connected to each other in series, each of the plurality of lower structures can be rotated around a pin, serving as a rotational axis, forward in the direction of gravitational force, but cannot be rotated backward, and (ii) an upper structure group constituted by the plurality of upper structures is such that, in a case where the plurality of upper structures of the upper structure group are arranged to be connected to each other in series, each of the plurality of upper structures can be rotated around a pin either (i) forward and backward in the direction of gravitational force or (ii) not backward but only forward in the direction of gravitational force.

As illustrated in FIGS. 11 and 13, the upper structure group and the lower structure group, arranged in parallel with each other in the horizontal direction, (i) can be coupled with each other by use of the same mechanism as that of the drive means 40 described above so as to have a rigid structure, (ii) can release such a coupling structure, and therefore (iii) can have the same effects as those of the arrangement illustrated in FIG. 2. Note that, either in the arrangement illustrated in FIG. 11 or in the arrangement illustrated in FIG. 13, (i) the drive means 40 illustrated in FIG. 2 can be provided either below the lower structure group or above the upper structure group, or, alternatively, (ii) the drive means 40 can be provided blow the lower structure group, and at the same time, another drive means 40 can be provided above the upper structure group.

In other words, as illustrated in FIGS. 11, 12, and 13, the direct acting extensible and retractable arm joint J3 of the present invention is formed in such a manner that the upper structure group and the lower structure group overlap each other to have a rigid structure. Further, the inside of the direct acting extensible and retractable arm joint J3 is a hollowed structure, and a wiring line can be provided inside the direct acting extensible and retractable arm joint J3. Note, however, that the present invention is not limited to this. It is possible that the direct acting extensible and retractable arm joint J3 does not have such a hollowed structure, and the wiring line cannot be provided inside the direct acting extensible and retractable arm joint J3. That is, direct acting extensible and retractable arm joint J3 can have an arrangement in which the upper structure group and/or the lower structure group have an arrangement in which a plurality of structures, each having neither a concave shape nor a hollowed shape, are connected to each other in series.

The arrangement of the present invention is thus described. Note, however, that the present embodiment is merely an example of the present invention. The present invention is not limited to the scope of the description of the present embodiment, and various alterations and/or substitutions can be carried out by a skilled person within the scope of claims.

Effects of the Present Embodiment

By using the robot arm 50 of the present embodiment, having the arrangement described above, it is possible to carry out extension and retraction of the arm of the arm section, without using a bending joint link. For this reason, it is possible to prevent an object from being sandwiched between arms due to rotation of a rotational joint provided between the arms.

This effect is a significant advantage for a welfare robot arm for supporting an operation in a daily life in place of human power. Further, particularly, according to the robot arm of the present embodiment, the extension and retraction of the arm is realized by use of only the direct acting extensible and retractable arm. Accordingly, in a case where the robot arm of the present embodiment is provided at a wheel chair or in the vicinity of a bed, as a welfare robot arm, it is possible to minimize a range in which a user's visibility is limited, as compared with the arrangement employing the bending joint link between the arms. Furthermore, an extension/retraction move of the robot arm of the present embodiment is simple and minimum in front of the user.

It is therefore possible to reduce visual discomfort of the user, as compared with the arrangement employing the bending joint link between the arms.

The inventors of the present invention have focused on such a situation that, generally, in a case where a handicapped person uses a robot arm as an assistant robot or a welfare robot, saliva of the user or food particles are likely to adhere to the robot arm. In such a situation, since the arrangement employing the bending joint link has, on a surface, a lot of gaps between links, it is likely that a finger is accidentally withdrawn to the inside of the direct acting extensible and retractable arm mechanism or an object (a foreign matter or dust) adhering to the arm section enters the inside of the direct acting extensible and retractable arm mechanism. This might cause constituents of the direct acting extensible and retractable arm mechanism not to work smoothly in combination with each other, and, as a result, it might become impossible to cause the direct acting extensible and retractable arm mechanism to be in operation normally. On the other hand, according to the arrangement of the present invention, the upper surface of the arm section is a plane surface having no gap. Accordingly, there is no risk that a normal operation of the direct acting extensible and retractable arm mechanism is prevented. It is thus possible to realize a robot arm which has a high reliability in its operation.

Modified Example 1 of the Present Embodiment

As a matter of course, the extensible and retractable arm mechanism can be altered variously. For example, shapes of the upper structure 22 and the lower structure 23, or a method of causing the arm section 2 to have a rigid structure can be changed.

Figure 14:
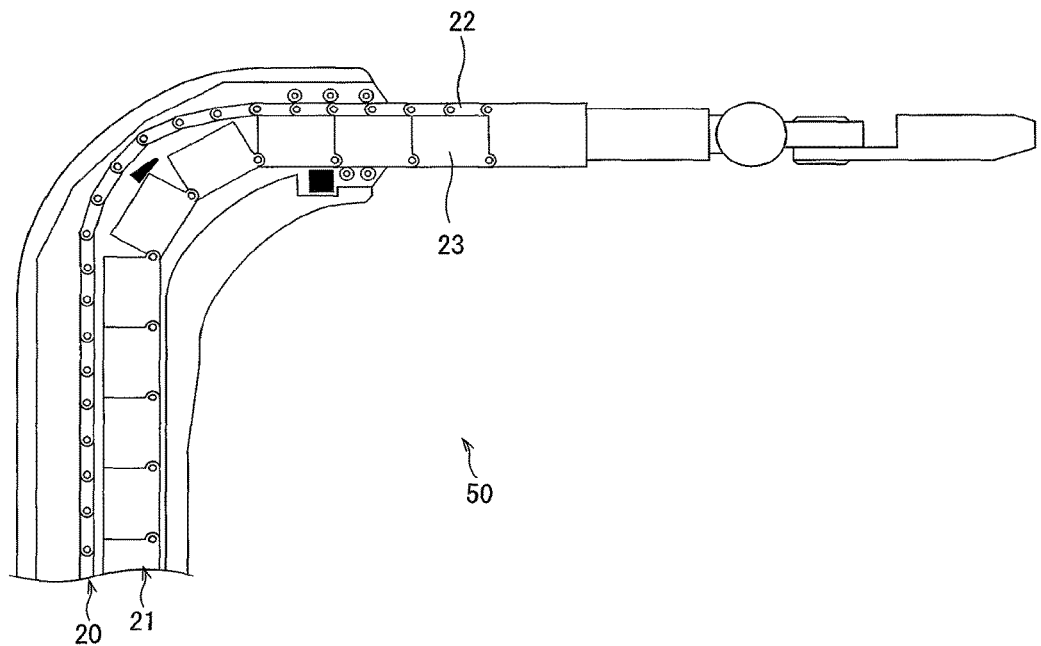
FIG. 14 is a cross-sectional view illustrating a modified example of the direct acting extensible and retractable arm mechanism in accordance with the embodiment of the present invention.

For example, a length of the upper structure 22 in the longitudinal direction can be shorter than a length of the lower structure 23 in the longitudinal direction, as illustrated in FIG. 14.

Figure 15:
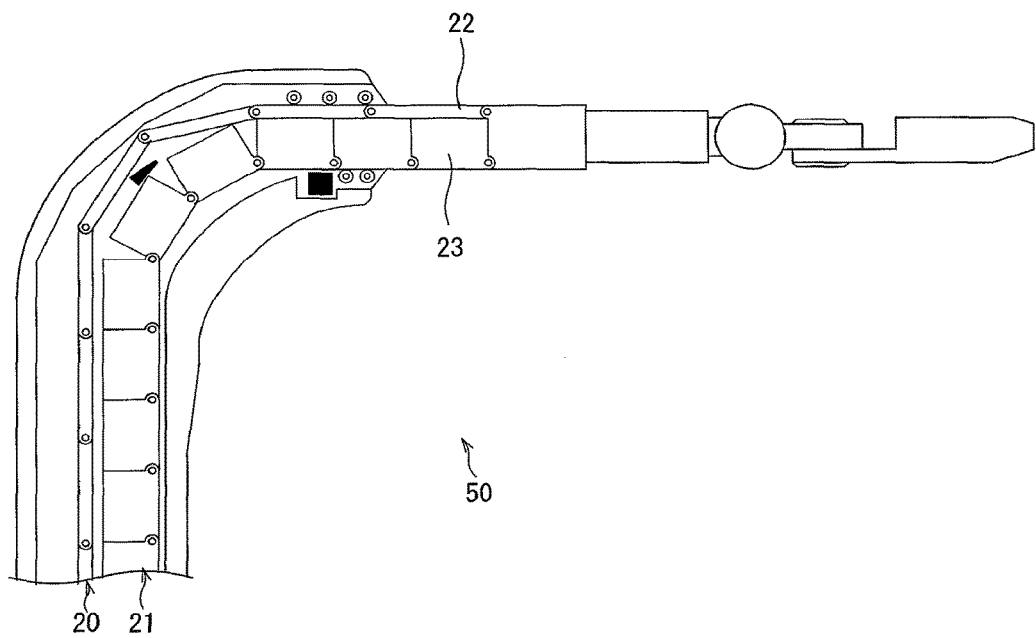
FIG. 15 is a cross-sectional view illustrating a modified example of the direct acting extensible and retractable arm mechanism in accordance with the embodiment of the present invention.

Alternatively, the length of the upper structure 22 in the longitudinal direction can be longer than the length of the lower structure 23 in the longitudinal direction, as illustrated in FIG. 15.

Figure 16:
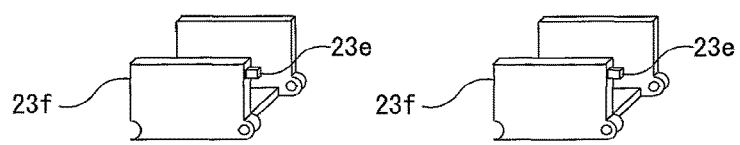
FIG. 16 is a cross-sectional view illustrating a modified example of the direct acting extensible and retractable arm mechanism in accordance with the embodiment of the present invention.

The lower structure group 21 is such that adjacent ones of the plurality of lower structures are coupled with each other via only a pin 30. For this reason, it is possible that, in a case where (i) adjacent ones of the plurality of lower structures 23 are arranged to be connected to each other in series such that their concave opening sections face in the same direction, the adjacent ones of the plurality of lower structures 23 can be rotated so that their opening sections face outward to form a V shape. However, as illustrated in FIG. 16, it is possible to have such an arrangement that (i) each of the plurality of lower structures 23 includes lock mechanisms 23e and 23f, (ii) when the arm section is outputted from the opening section 10c' illustrated in FIG. 7, a lock mechanism 23e of one of adjacent ones of the plurality of lower structures 23 and a lock mechanism 23f of the other one of adjacent ones of the plurality of lower structures 23 are connected to each other so that the adjacent ones of the plurality of lower structures 23 are fixed and cannot be rotated, and (iii) when the arm section is stored in the robot arm supporting member 1 via the opening section 10c', the lock mechanism 23e and the lock mechanism 23f are released from each other so that the adjacent ones of the plurality of lower structures 23 are separated from each other and each of the adjacent ones of the plurality of lower structures 23 can be rotated around a corresponding pin 30 serving as a rotational axis.

Modified Example 2 of the Present Embodiment

According to the present embodiment, as illustrated in FIG. 7, (i) the drive means 40a for the lower structure group includes the drive mechanism 33 that is constituted by (a) the gear 34 which engages with the bottom surface convex-concave structure 23a of each of the plurality of lower structures 23, and (b) the actuator 35 for driving the gear 34, and the drive means 40a is provided below each of the plurality of lower structures 23, (ii) the drive means 40b for the upper structure group includes the drive mechanism that is constituted by (a) the gear which engages with the upper convex-concave structure of each of the plurality of upper structures 22 and (b) the actuator for driving the gear, and the drive means 40b is provided above each of the plurality of upper structures 22, and (iii) the driving is carried out by use of at least one of the drive means 40a and the drive means 40b. Note, however, that the present invention is not limited to this, and the drive means can be provided either (1) on a left side of the upper structure group and/or the lower structure group, or (2) on a right side of the upper structure group and/or the lower structure group.

Modified Example 2-(a)

Figure 17:
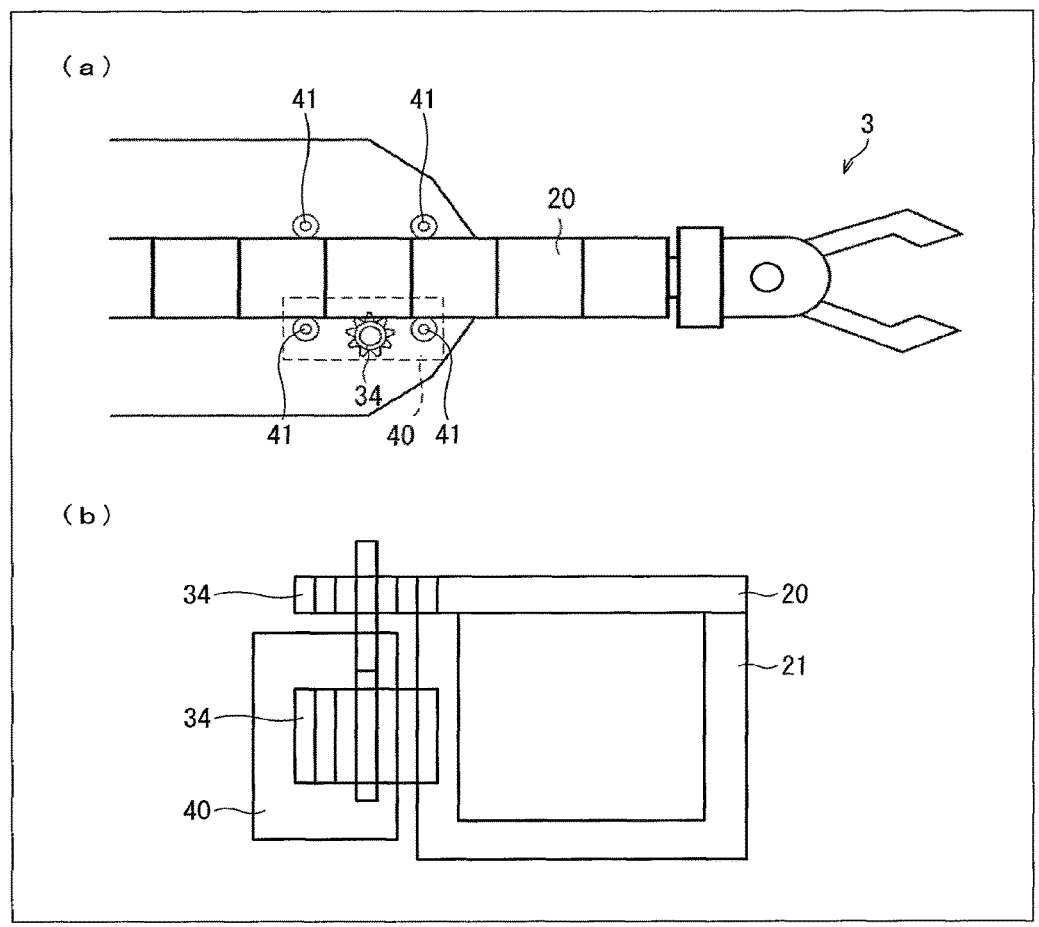
FIG. 17 is a view illustrating a modified example of the direct acting extensible and retractable arm mechanism in accordance with the embodiment of the present invention: (a) of FIG. 17 is a top view; and (b) of FIG. 17 is a front view.

First, the following description deals with Modified Example 2-(a). (a) of FIG. 17 is a perspective view illustrating the upper surface of the third supporting section 10c (the upper structures 22). (a) of FIG. 17 illustrates a region in the vicinity of the opening section 10c' of the third supporting section 10c. Here, the plurality of upper structures 22 are connected to each other in series to have a rigid structure in such a manner that the plurality of upper structures 22 are connected to the respective plurality of lower structures 23 of the lower structure group (a deep side in (a) of FIG. 17).

According to Modified Example 2-(a), at least the gear 34 is provided on the right side with respect to an extensible and retractable direction of the arm constituted by the plurality of upper structures 22 and the plurality of lower structures 23. As illustrated in (b) of FIG. 17, the gear 34 is formed so as to be in contact with both the plurality of upper structures 22 and the plurality of lower structures 23. It is possible that in not only the gear 34 but also the drive mechanism including the actuator for driving the gear 34 is also provided on the right side of the arm section constituted by the plurality of upper structures 22 and the plurality of lower structures 23.

According to Modified Example 2-(a), it is preferable that a concave-convex structure which engages with the gear 34 is formed both (i) on a right surface of each of the plurality of upper structures 22 and (ii) on a right surface of each of the plurality of lower structures 23.

Further, in the same manner as the arrangement illustrated in FIG. 7, the pressing rollers 41 are provided, respectively, on the right side of the plurality of upper structures 22 and the plurality of lower structures 23 and on the left side of the plurality of upper structures 22 and the plurality of lower structures 23. The pressing rollers 41, provided, respectively, on the right side and on the left side, can be in contact with both the plurality of upper structures 22 and the plurality of lower structures 23. Alternatively, the pressing rollers 41 can be in contact with one of (i) the plurality of upper structures 22 and (ii) the plurality of lower structures 23.

Modified Example 2-(b)

Modified Example 2-(b) is such that the drive mechanism of Modified Example 2-(a) described above, constituted by the gear 34 and the actuator for driving the gear 34, is provided on the left side of the plurality of upper structures 22 and the plurality of lower structures 23.

Modified Example 2-(c)

According to Modified Example 2-(a) described above, the gear 34 is provided on the right side of the plurality of upper structures 22 the plurality of lower structures 23, so as to cause both the plurality of upper structures 22 and the plurality of lower structures 23 to be moved. Meanwhile, Modified Example 2-(c) is such that the gear 34, which is in contact with (engages with) the plurality of upper structures 22, is provided on the right side of the plurality of upper structures 22, and another gear 34, which is in contact with (engages with) the plurality of lower structures 23, is provided on the left side of the plurality of lower structures 23.

According to the arrangement, it is also possible to realize successful driving, in the same manner as the embodiment described above.

Modified Example 2-(d)

Modified Example 2-(d) is such that the positions of the gear 34 and the another gear 34, described in Modified Example 2-(c), are replaced with each other, that is, the gear 34, which is in contact with (engages with) the plurality of upper structures 22, is provided on the left side of the plurality of upper structures 22, and the another gear 34, which is in contact with (engages with) the plurality of lower structures 23, is provided on the right side of the plurality of lower structures 23.

Modified Example 2-(e)

Modified Example 2-(e) is such that (i) the gear provided on the right side of the plurality of upper structures 22 is in contact with (engages with) the plurality of upper structures 22, so as to drive both the plurality of upper structures 22 and the plurality of lower structures 23, or (ii) the gear provided on the right side of the plurality of lower structures 23 is in contact with (engages with) the plurality of lower structures 23, so as to drive both the plurality of lower structures and the plurality of upper structures 22.

Alternatively, Modified Example 2-(e) is such that (i) the gear provided on the left side of the plurality of upper structures 22 is in contact with (engages with) the plurality of upper structures 22, so as to drive both the plurality of upper structures 22 and the plurality of lower structures 23, or (ii) the gear provided on the right side of the plurality of lower structures 23 is in contact with (engages with) the plurality of lower structures 23, so as to drive both the plurality of lower structures 23 and the plurality of upper structures 22.

Modified Example 2-(f)

Modified Example 2-(f) is such that, in addition to the upper gear 34 and the lower gear 34 of Modified Example 2-(a), provided on the right side, another upper gear 34 and another lower gear 34 are further provided on the left side.

According to Modified Examples 2-(a) through 2-(f), the gear 34 and the drive mechanism are provided at least one of (i) on the left side of the arm section and (ii) on the right side of the arm section. With the arrangement, it is possible to avoid an influence of gravitational force, as compared with the arrangement in which the gear 34 and the drive mechanism are provided at an upper position and a lower position, respectively. Specifically, in a case where the gear 34 and the drive mechanism are provided at the upper position and lower position, respectively, as illustrated in FIG. 7, there is an influence, such as force and torque, on the drive means due to gravitational force (gravitational force related to the arm section). This might cause an increase in driving torque and an increase in abrasion. However, with each of the arrangements of Modified Examples 2-(a) through 2-(f), it is possible to avoid these problems.

Further, according to Modified Example 2-(f), it is possible to carry out driving while maintaining a balance of the arm section with horizontally-symmetric force by avoiding a situation that (i) driving force is generated from only one side, (ii) and the other side is supported by a roller, and, as a result, (iii) horizontally-symmetric force is cannot be obtained.

Modified Example 3 of the Present Embodiment

Figure 18:
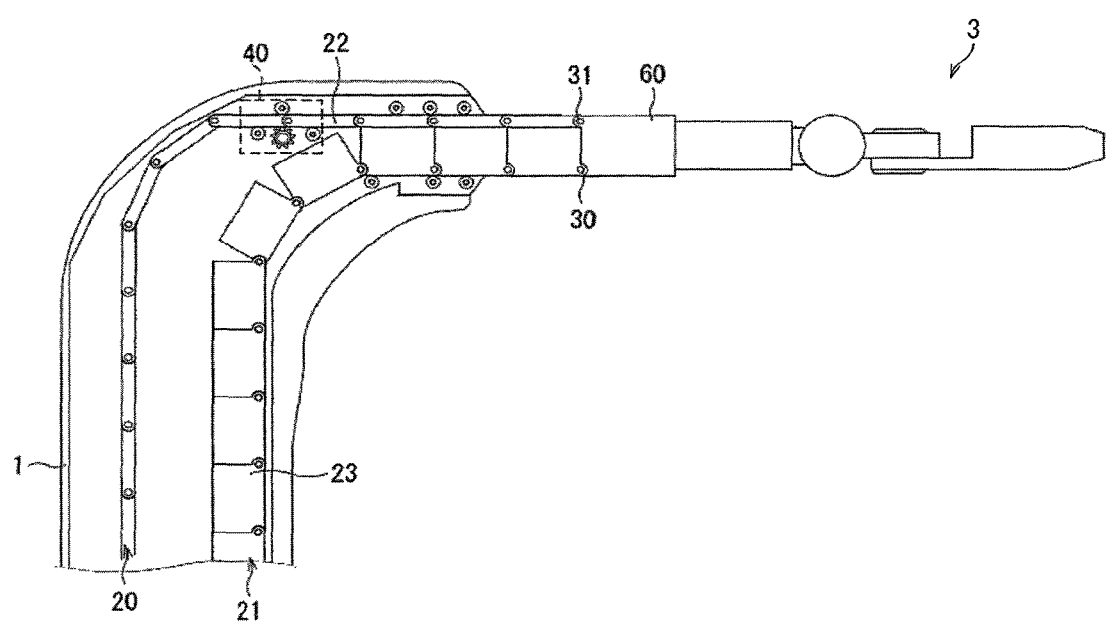
FIG. 18 is a cross-sectional view illustrating a modified example of the direct acting extensible and retractable arm mechanism in accordance with the embodiment of the present invention.
Figure 19:
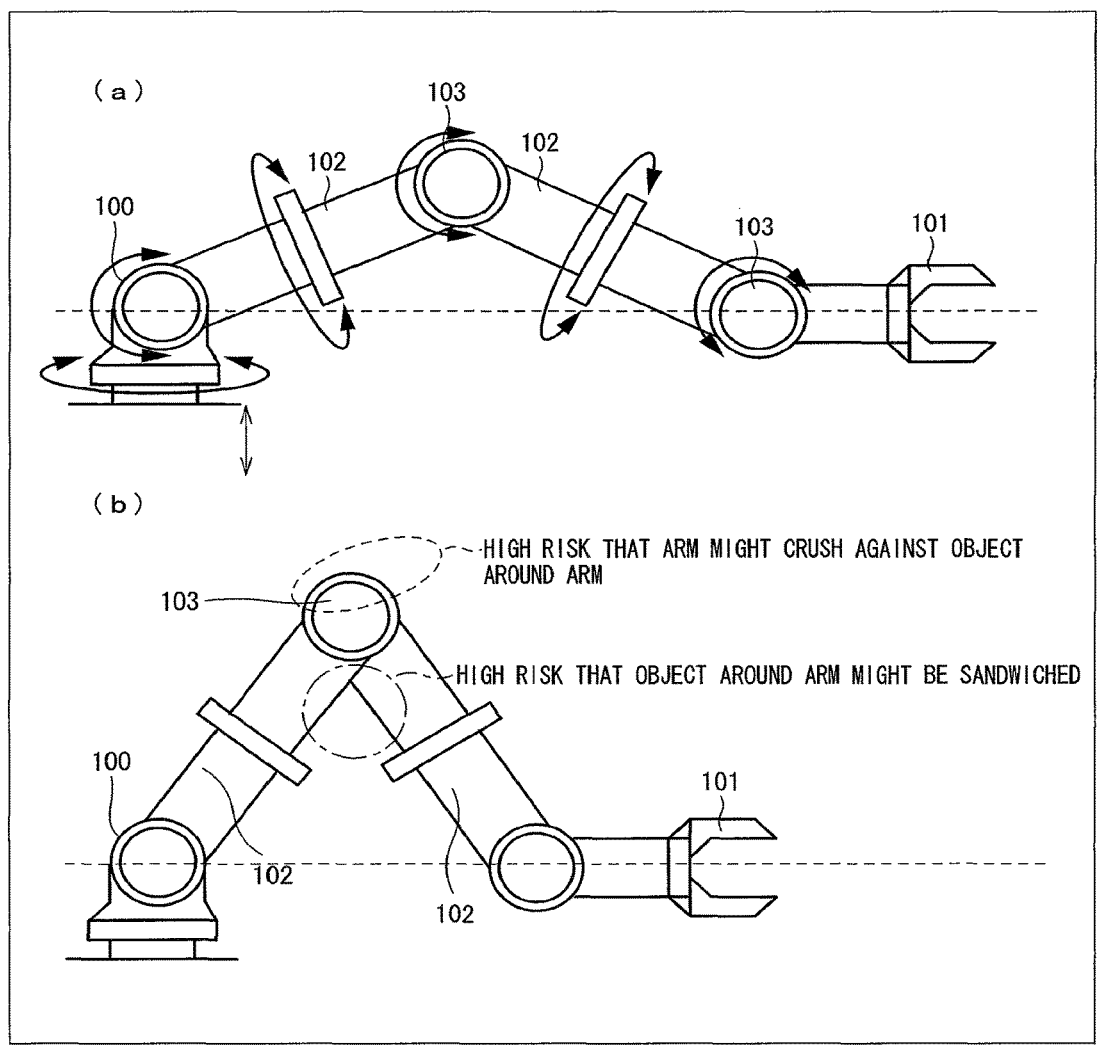
FIG. 19 is a view illustrating a conventional arrangement.

With the drive means illustrated in FIG. 7 or 17, there is a risk that a tooth plane might be added to a surface of the direct acting mechanism, and entry of a foreign matter might not be prevented completely. Further, there is also a risk that the tooth plane might be in contact with a human or an object in the vicinity of the direct acting mechanism. In view of these, it is possible to have such an arrangement that the tooth plane is deleted from the surface of the direct acting mechanism, so as to avoid the entry of a foreign matter. Further, in order to eliminate the risk that the tooth plane is in contact with a human or an object in the vicinity of the direct acting mechanism, it is possible to provide the gear 34 between the upper structure group 20 and the lower structure group 21, as illustrated in FIG. 18. That is, the tooth plane is added to a bottom section of each of the plurality of upper structures 22 (a surface which faces the plurality of lower structures 23), and the tooth plane is driven by the drive means. With the arrangement, it is possible to cause both the upper structure group and the lower structure group to be in operation. The tooth plane of the bottom section of each of the plurality of upper structures 22 can also be used to engage with a corresponding one of the plurality of lower structures. 23.

It is necessary that, before the upper structure group 20 is in contact with the gear 34, the upper structure group 20 is arranged linearly (maintained horizontally) by use of a roller. For this reason, a first roller is provided in the upstream with respect to the gear, a second roller is provided in the downstream with respect to the gear, and a third roller is provided above the gear. The drive means is located on a backside with respect to the opening section 10c' of the third supporting section 10c. Accordingly, it becomes possible to cause the opening section 10c' to have a small size.

Further, since gravitational force does not have an influence on the drive means, it is possible to have a reduction in driving torque and a reduction in abrasion.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

CONCLUSION OF THE PRESENT INVENTION

As described above, a direct acting extensible and retractable arm mechanism of the present invention includes: a robot arm supporting member; a robot arm supporting member; and an arm section being extensible and retractable directly from one of ends of the robot arm supporting member, the arm section being such that a hand section is attachable to one of ends of the arm section, the arm section being constituted by (i) a first structure group in which a plurality of first structures are coupled with each other in series in such a manner that adjacent ones of the plurality of first structures are coupled with each other via a corresponding one of a plurality of first coupling axes in a direction which is orthogonal to a direction of the corresponding one of the plurality of first coupling axes and (ii) a second structure group in which a plurality of second structures are coupled with each other in series in such a manner that adjacent ones of the plurality of second structures are coupled with each other via a corresponding one of a plurality of second coupling axes in a direction which is orthogonal to a direction of the corresponding one of the plurality of second coupling axes, the plurality of first structures being identical with each other in width in a direction parallel to the plurality of first coupling axes, the plurality of second structures being identical with each other in width in a direction parallel to the plurality of second coupling axes, the first structure group and the second structure group being coupled with each other in such a manner that one of two end first structures of the plurality of first structures, on a hand section side, and one of two end second structures of the plurality of second structures, on the hand section side, are coupled with each other, the robot arm supporting member including, at one of ends of the robot arm supporting member, drive means for (i) pressing the first structure group and the second structure group so that the first structure group and the second structure group become closer to each other and become in contact with each other, (ii) causing the first structure group and the second structure group to overlap each other so that a surface of the first structure group and a surface of the second structure group, which surfaces are in contact with each other, do not slip with respect to each other, and (iii) driving the first structure group and the second structure group in a direction in which the arm section is extensible, in a case where the drive means causes the first structure group and the second structure group to overlap each other, the first structure group and the second structure group forming such a rigid arm section that rotation of each of the plurality of first structures via the corresponding one of the plurality of first coupling axes and rotation of each of the plurality of second structures via the corresponding one of the plurality of second coupling axes are prevented, at least one of the first structure group and the second structure group is such that adjacent ones of structures engage with each other via their side surfaces, and form a plane surface having no gap, which plane surface faces and is in contact with a surface of the other one of the first structure group and the second structure group, the robot arm supporting member including separation means in the robot arm supporting member, in a case where the drive means carries out reverse driving, the separation means causes the first structure group and the second structure group to be separated from each other so that (i) each of the plurality of first structures is rotatable around the corresponding one of the plurality of first coupling axes and (ii) each of the plurality of second structures is rotatable around the corresponding one of the plurality of second coupling axes.

Further, in addition to the arrangement, the direct acting extensible and retractable arm mechanism of the present invention is preferably arranged such that in a case where (i)

the drive means causes the first structure group and the second structure group to overlap each other and therefore (ii) the arm section becomes rigid in such a manner that the rotation of each of the plurality of first structures via the corresponding one of the plurality of first coupling axes and the rotation of each of the plurality of second structures via the corresponding one of the plurality of second coupling axes are prevented, and one of the first structure group and the second structure group is provided above the other one of the first structure group and the second structure group, the one of the first structure group and the second structure group is such that adjacent ones of structures engage with each other via their side surfaces and forms a plane surface having no gap, which plane surface is opposite to a surface that is in contact with a surface of the other one of the first structure group and the second structure group.

Furthermore, in addition to the arrangement, the direct acting extensible and retractable arm mechanism of the present invention is preferably arranged such that the first structure group is such that adjacent ones of the plurality of first structures engage with each other via their side surfaces and form a plane surface having no gap, which plane surface is opposite to a surface that is in contact with a surface of the second structure group, and the second structure group is such that adjacent ones of the plurality of second structures engage with each other via their side surfaces and form a plane surface having no gap, which plane surface is opposite to the surface that is in contact with the surface of the first structure group.

Moreover, in addition to the arrangement, the direct acting extensible and retractable arm mechanism of the present invention is preferably arranged such that the one of two end first structures of the plurality of first structures and the one of two end second structures of the plurality of second structures are physically attached to each other or physically welded with respect to each other.

Further, in addition to the arrangement, the direct acting extensible and retractable arm mechanism of the present invention is preferably arranged such that the one of two end first structures of the plurality of first structures and the one of two end second structures of the plurality of second structures are combined with a common block. Furthermore, in addition to the arrangement, the direct acting extensible and retractable arm mechanism of the present invention preferably further includes: a pressing member for supporting said pressing of the first structure group and the second structure group, the pressing member pressing at least one of the first structure group and the second structure group.

Moreover, in addition to the arrangement, the direct acting extensible and retractable arm mechanism of the present invention is preferably arranged such that the drive means is such that (i) the drive means includes a drive mechanism constituted by a gear(s) and an actuator for rotating the gear(s), and the gear(s) is in contact with one of the first structure group and the second structure group so as to drive both the first structure group and the second structure group, or (ii) the drive means includes two drive mechanisms each being constituted by a gear(s) and an actuator for rotating the gear(s), and the gear (s) of one of the two drive mechanisms is in contact with one of the first structure group and the second structure group and the gear(s) of the other one of the two drive mechanisms is in contact with the other one of the first structure group and the second structure group, so as to dive both the first structure group and the second structure group.

Further, in addition to the arrangement, the direct acting extensible and retractable arm mechanism of the present invention is preferably arranged such that the gear is provided between the first structure group and the second structure group.

Furthermore, in addition to the arrangement, the direct acting extensible and retractable arm mechanism of the present invention is preferably arranged such that a length from a surface of each of the plurality of first structures constituting the first structure group, which surface is in contact with the second structure group, to an opposite surface of each of the plurality of first structure, and a length from a surface of each of the plurality of second structures constituting the second structure group, which surface is in contact with the first structure group, to an opposite surface of each of the plurality of second structures, are identical with each other or different from each other.

Moreover, in addition to the arrangement, the direct acting extensible and retractable arm mechanism of the present invention is preferably arranged such that, in a case where (i) the drive means causes the first structure group and the second structure group to overlap each other and therefore (ii) the arm section becomes rigid in such a manner that the rotation of each of the plurality of first structures via the corresponding one of the plurality of first coupling axes and the rotation of each of the plurality of second structures via the corresponding one of the plurality of second coupling axes are prevented, one of the first structure group and the second structure group is provided above the other one of the first structure group and the second structure group, and a plurality of coupling axes of the other one of the first structure group and the second structure group are located below a plurality of coupling axes of the one of the first structure group and the second structure group in a direction of gravitational force.

Further, in addition to the arrangement, the direct acting extensible and retractable arm mechanism of the present invention is preferably arranged such that, in a case where (i) the drive means causes the first structure group and the second structure group to overlap each other and therefore (ii) the arm section becomes rigid in such a manner that the rotation of each of the plurality of first structures via the corresponding one of the plurality of first coupling axes and the rotation of each of the plurality of second structures via the corresponding one of the plurality of second coupling axes are prevented, one of the first structure group and the second structure group is provided above the other one of the first structure group and the second structure group, and each of a plurality of coupling axes of the other one of the first structure group and the second structure group is located below a region between adjacent ones of a plurality of coupling axes of the one of the first structure group and the second structure group in a direction of gravitational force.

Furthermore, in addition to the arrangement, the direct acting extensible and retractable arm mechanism of the present invention is preferably arranged such that a surface of the first structure group and a surface of the second structure group, which surfaces are in contact with each other, have, respectively, gear sections which engage with each other.

Moreover, in addition to the arrangement, the direct acting extensible and retractable arm mechanism of the present invention is preferably arranged such that each of a plurality of structures constituting one of the first structure group and the second structure group has a plurality of gear sections on its surface which is in contact with a surface of the other one of the first structure group and the second structure group, and the plurality of gear sections engage with both gear sections of adjacent ones of a plurality of structures of the other one of the first structure group and the second structure group. Further, in addition to the arrangement, the direct acting extensible and retractable arm mechanism of the present invention is preferably arranged such that the robot arm supporting member is capable of storing, inside the robot arm supporting member, the first structure group and the second structure group which have been separated from each other by the separation means, and the first structure group and the second structure group, separated from each other by the separation means, are stored along an inner shape of the robot arm supporting member by (i) the rotation of each of the plurality of first structures via the corresponding one of the plurality of first coupling axes and (ii) the rotation of each of the plurality of second structures via the corresponding one of the plurality of second coupling axes.

INDUSTRIAL APPLICABILITY

A robot arm of the present invention includes an arm section constituted by a direct acting extensible and retractable arm mechanism including a plurality of upper structures, a plurality of lower structures, and drive means.

Accordingly, with the robot arm, it is possible to (i) prevent significantly a finger from being sandwiched in the robot arm or prevent significantly dust from entering the robot arm, and (ii), by storing the direct acting extensible and retractable arm mechanism in a robot arm supporting member, realize a reduction in a space necessary for the robot arm.

Accordingly, for example, the robot arm of the present invention can be used by a handicapped person as a support robot or a welfare robot, and is also used as a robot arm for producing a next-generation robot arm for cellular manufacturing, which operates in the vicinity of a human in cooperation with the human.

REFERENCE SIGNS LIST

1. Robot arm supporting member (base)
2. Arm section
3. Hand section (end effector)
10a: First supporting section
10b: Second supporting section
10c: Third supporting section
10c': Opening section
20: Upper structure group
21: Lower structure group
22: Upper structure
22a: Bottom surface convex-concave structure (alignment section)
22b: Side surface
23: Lower structure
23a: Side surface convex-concave structure (engaging section)
23b: Side surface
23c: Upper surface convex-concave structure
23d: Bottom surface convex-concave structure
23e: Lock mechanism
23f: Lock mechanism
24a: Through hole
24b: Through hole
25a: Through hole
25b: Through hole
27: Upper structure
28: Lower structure
30: Pin
31: Pin
33: Drive mechanism
34: Gear
35: Actuator
40: Drive means (drive mechanism)
40a: Drive means for lower structure group
40b: Drive means for upper structure group
40c: Separation means
41: Pressing roller (pressing member)
42: Pressing roller (pressing member)
50: Robot arm (direct acting extensible and retractable arm mechanism)
60: Common block member
70: First finger
71: Second finger
72: Two-finger hand
G: Installation surface
J1: First rotational joint (rotational joint means)
J2: Second rotational joint
J3: Direct Acting extensible and retractable arm joint (combined structure of upper structures and lower structures)
J4: Fourth rotational joint
J5: Fifth rotational joint
J6: Sixth rotational joint
J7: Seventh rotational joint

The invention claimed is:
1. A multi-joint arm mechanism, comprising:
an arm supporting member;
a first joint having a first rotational axis parallel to a center axis of the arm supporting member;
a second joint having a second rotational axis perpendicular to the center axis of the arm supporting member; and
a third joint having a linear extension and retraction axis perpendicular to the second rotational axis,
the third joint comprising:
a plurality of flat-shaped first structures bendably coupled to one another, the plurality of flat-shaped first structures forming a first string of the first structures;
a plurality of second structures having a C-shaped section and bendably coupled to one another at bottom parts of the second structures, the plurality of second structures forming a second string of the second structures, wherein the first string and the second string are linearly stiffened by being in contact with each other and return to a bent state by being separated from each other;
a supporting member which supports the stiffened first and second structures in such a manner that the first and second structures are movable forward and backward; and
a drive member which sends the stiffened first and second structures forward from the supporting member and draws the stiffened first and second structures back,
wherein:
the second string is configured to be bent toward the bottom parts and conveyed into the arm supporting member from the supporting member;
the first string is configured to be bent in a same direction as the second string, and conveyed into the arm supporting member from the supporting member;
the second structures are stored in the arm supporting member;
the first structures are stored in the arm supporting member along the second structures; and
the plurality of flat-shaped first structures are coupled to one another without interposition of any of the second structures, and the plurality of second structures are coupled to one another without interposition of any of the first structures.

2. The multi-joint arm mechanism of claim 1, wherein the supporting member comprises a plurality of rollers.

3. The multi-joint arm mechanism of claim 1, the stiffened first and second structures form a columnar body having a flat surface.

4. The multi-joint arm mechanism of claim 1, wherein a top first structure of the first structures is coupled to a top second structure of the second structures.

5. The multi-joint arm mechanism of claim 1, further comprising a separation member which separates the second structures from the first structures behind the supporting member.

6. The multi-joint arm mechanism of claim 1, wherein a linear gear is formed on inner surfaces of the first structures, the drive member is located behind the roller, and
the multi-joint arm mechanism further comprises a drive gear engaged with the linear gear and an actuator which drives the drive gear.

7. The multi-joint arm mechanism of claim 1, wherein each of the first structures has a same length as each of the second structures.

8. The multi-joint arm mechanism of claim 1, each of the first structures has a same length as each of the second structures, and a top first structure the first structures is shifted from a top second structure of the second structures.

9. The multi-joint arm mechanism of claim 1, wherein the first and second structures are provided with engagement parts which engage with each other.

10. A linear extension and retraction mechanism, comprising:
a plurality of flat-shaped first structures bendably coupled to one another, the plurality of flat-shaped first structures forming a first string of the first structures;
a plurality of second structures having a C-shaped section and bendably coupled to one another at bottom parts of the second structures, the plurality of second structures forming a second string of the second structure, wherein the first structures and the second structures are linearly stiffened by being in contact with each other and return to a bent state by being separated from each other;
a supporting member which supports the stiffened first and second structures in such a manner that the first and second structures are movable forward and backward;
a drive member which sends the stiffened first and second structures forward from the supporting member and draws the stiffened first and second structures back; and
a storage which stores the first and second structures, wherein:
the second string is configured to be bent toward the bottom parts and conveyed into the storage from the supporting member;
the first string is configured to be bent in a same direction as the second string, and conveyed into the storage from the supporting member;
the first structures are stored in the storage along the second structures; and
the plurality of flat-shaped first structures are coupled to one another without interposition of any of the second structures, and the plurality of second structures are coupled to one another without interposition of any of the first structures.

11. A robot apparatus comprising a multi-joint arm mechanism, the multi-joint arm mechanism comprising:
an arm supporting member;
a first joint having a first rotational axis parallel to a center axis of the arm supporting member;
a second joint having a second rotational axis perpendicular to the center axis of the arm supporting member; and
a third joint having a linear extension and retraction axis perpendicular to the second rotational axis,
the third joint comprising:
a plurality of flat-shaped first structures bendably coupled to one another, the plurality of flat-shaped first structures forming a first string of the first structures;
a plurality of second structures having a C-shaped section and bendably coupled to one another at bottom parts of the second structures, the plurality of second structures forming a second string of the second structure, wherein the first structures and the second structures are linearly stiffened by being in contact with each other and return to a bent state by being separated from each other;
a supporting member which supports the stiffened first and second structures in such a manner that the first and second structures are movable forward and backward; and
a drive member which sends the stiffened first and second structures forward from the supporting member and draws the stiffened first and second structures back,
wherein:
the second string is configured to be bent toward the bottom parts and conveyed into the arm supporting member from the supporting member;
the first string is configured to be bent in a same direction as the second structures, and conveyed into the arm supporting member from the supporting member;
the second structures are stored in the arm supporting member;
the first structures are stored in the arm supporting member along the second structures; and
the plurality of flat-shaped first structures are coupled to one another without interposition of any of the second structures, and the plurality of second structures are coupled to one another without interposition of any of the first structures.

* * * * *